United States Patent
Nakaura et al.

(10) Patent No.: US 8,534,410 B2
(45) Date of Patent: Sep. 17, 2013

(54) PEDESTRIAN PROTECTION DEVICE FOR VEHICLE

(75) Inventors: Masaki Nakaura, Hiroshima (JP);
Kazuhiro Tanaka, Hiroshima (JP);
Masatoshi Takayama, Hiroshima (JP);
Tadashi Ioka, Hiroshima (JP)

(73) Assignee: Mazda Motor Corporation (JP)

( * ) Notice: Subject to any disclaimer, the term of this patent is extended or adjusted under 35 U.S.C. 154(b) by 630 days.

(21) Appl. No.: 12/711,074

(22) Filed: Feb. 23, 2010

(65) Prior Publication Data
US 2010/0244484 A1 Sep. 30, 2010

(30) Foreign Application Priority Data

Mar. 31, 2009 (JP) .................................. 2009-087448
Mar. 31, 2009 (JP) .................................. 2009-087452

(51) Int. Cl.
*B62D 25/10* (2006.01)

(52) U.S. Cl.
USPC .................... 180/274; 180/69.21; 296/187.04

(58) Field of Classification Search
USPC ............... 180/274, 69.2, 69.21; 296/187.11, 296/35.2, 187.04, 193.11; 293/107
See application file for complete search history.

(56) References Cited

U.S. PATENT DOCUMENTS

| | | | |
|---|---|---|---|
| 5,093,952 A * | 3/1992 | Nakatsukasa et al. | 15/250.13 |
| 5,385,212 A * | 1/1995 | Cady et al. | 180/69.21 |
| 5,435,406 A * | 7/1995 | Gaffoglio et al. | 180/69.21 |
| 5,437,348 A * | 8/1995 | Cady et al. | 180/69.21 |
| 5,697,467 A * | 12/1997 | Howard | 180/69.21 |
| 5,853,060 A * | 12/1998 | Chao et al. | 180/69.2 |
| 6,182,782 B1 * | 2/2001 | Matsuura et al. | 180/274 |
| 6,415,882 B1 * | 7/2002 | Schuster et al. | 180/69.21 |
| 6,439,330 B1 * | 8/2002 | Paye | 180/69.21 |
| 6,510,914 B2 * | 1/2003 | Ishizaki et al. | 180/274 |
| 6,755,268 B1 * | 6/2004 | Polz et al. | 180/69.21 |
| 6,802,556 B2 * | 10/2004 | Mattsson et al. | 296/187.09 |
| 7,000,720 B2 * | 2/2006 | Polz et al. | 180/69.21 |
| 7,195,090 B2 * | 3/2007 | Parks et al. | 180/271 |
| 7,207,406 B1 * | 4/2007 | Polz et al. | 180/69.21 |

(Continued)

FOREIGN PATENT DOCUMENTS

| | | |
|---|---|---|
| DE | 102 04 594 A1 | 8/2003 |
| EP | 1 178 914 B1 | 2/2003 |

(Continued)

OTHER PUBLICATIONS

The Extended European Search Report dated Jun. 22, 2010; Application No. 10002701.0-1523.

*Primary Examiner* — Katy M Ebner
*Assistant Examiner* — Brodie Follman
(74) *Attorney, Agent, or Firm* — Studebaker & Brackett PC

(57) ABSTRACT

A pedestrian protection device for a vehicle is provided at a vehicle-body front portion which comprises an engine room, a cowl box provided at an upper portion of a dash panel and extending in a vehicle width direction, and an engine hood pivotally supported at the vehicle body via a first hinge provided at a rear end portion so as to cover over the engine room. An engine-hood guide mechanism guides the engine hood upwardly and rearwardly so as to cover at least part of the cowl box when a collision of a pedestrian against a front bumper face is detected or predicted, and lowers the engine hood downwardly when a load acting on the engine hood exceeds a specified load.

20 Claims, 15 Drawing Sheets

(56) References Cited

U.S. PATENT DOCUMENTS

| | | | |
|---|---|---|---|
| 7,232,178 B2* | 6/2007 | Neal et al. | 296/187.04 |
| 7,380,625 B2* | 6/2008 | Wang | 180/69.21 |
| 7,527,121 B2* | 5/2009 | Kitte et al. | 180/274 |
| 7,537,272 B2* | 5/2009 | Hirata et al. | 296/187.04 |
| 7,591,333 B1* | 9/2009 | Polz et al. | 180/69.2 |
| 7,730,990 B2* | 6/2010 | Boggess et al. | 180/274 |
| 7,815,007 B2* | 10/2010 | Mori et al. | 180/274 |
| 7,828,100 B2* | 11/2010 | Polz et al. | 180/69.21 |
| 7,854,289 B2* | 12/2010 | Gust | 180/274 |
| 7,857,087 B2* | 12/2010 | Matsuura et al. | 180/274 |
| 7,931,111 B2* | 4/2011 | Kim et al. | 180/274 |
| 7,946,376 B2* | 5/2011 | Hayashi et al. | 180/274 |
| 7,975,797 B2* | 7/2011 | Yuasa et al. | 180/274 |
| 7,997,375 B2* | 8/2011 | Shaw | 180/274 |
| 8,069,943 B2* | 12/2011 | Takahashi | 180/274 |
| 8,141,671 B2* | 3/2012 | Aoki et al. | 180/69.21 |
| 8,162,093 B2* | 4/2012 | Scheuch et al. | 180/274 |
| 2002/0171262 A1* | 11/2002 | Ozawa | 296/189 |
| 2003/0121710 A1* | 7/2003 | Hamada et al. | 180/274 |
| 2004/0113459 A1* | 6/2004 | Mattsson et al. | 296/187.04 |
| 2005/0194821 A1* | 9/2005 | Brown et al. | 296/193.11 |
| 2006/0290172 A1* | 12/2006 | Hirata et al. | 296/187.04 |
| 2007/0039772 A1* | 2/2007 | Stuve | 180/274 |
| 2007/0267892 A1* | 11/2007 | Scheuch et al. | 296/187.04 |
| 2008/0156556 A1* | 7/2008 | Takahashi | 180/69.21 |
| 2008/0308338 A1* | 12/2008 | Kitte et al. | 180/271 |
| 2009/0091158 A1* | 4/2009 | Wallman et al. | 296/187.04 |
| 2009/0127016 A1* | 5/2009 | Hayashi et al. | 180/274 |
| 2009/0145681 A1* | 6/2009 | Hayashi et al. | 180/274 |
| 2009/0223360 A1* | 9/2009 | Aoki et al. | 92/15 |
| 2009/0229901 A1* | 9/2009 | Aoki et al. | 180/69.21 |
| 2009/0266638 A1* | 10/2009 | Hayashi et al. | 180/274 |
| 2009/0302644 A1* | 12/2009 | Mori et al. | 296/193.11 |
| 2010/0024162 A1* | 2/2010 | Walz | 16/233 |
| 2010/0101048 A1* | 4/2010 | Thomas | 16/223 |
| 2010/0193277 A1* | 8/2010 | Boggess et al. | 180/274 |
| 2010/0244484 A1* | 9/2010 | Nakaura et al. | 296/187.04 |
| 2010/0294584 A1* | 11/2010 | Yuasa et al. | 180/274 |
| 2011/0031056 A1* | 2/2011 | Takahashi et al. | 180/274 |
| 2011/0259662 A1* | 10/2011 | Ishikawa et al. | 180/274 |
| 2012/0074715 A1* | 3/2012 | Kim | 292/201 |

FOREIGN PATENT DOCUMENTS

| | | |
|---|---|---|
| EP | 1 216 171 B1 | 8/2003 |
| EP | 1 516 787 A1 | 3/2005 |
| EP | 1 194 824 B1 | 9/2005 |
| EP | 1 759 937 A2 | 3/2007 |
| EP | 2 036 786 A1 | 3/2009 |
| GB | 2 382 549 A | 6/2003 |
| JP | 11-99966 A | 4/1999 |
| JP | 2004-338528 A | 12/2004 |
| WO | 2007/031267 A1 | 3/2007 |

* cited by examiner

PEDESTRIAN PROTECTION DEVICE FOR VEHICLE

BACKGROUND OF THE INVENTION

The present invention relates to a pedestrian protection device for a vehicle which is provided at a front portion of a vehicle body.

In case a pedestrian collides with a traveling vehicle from the front, the pedestrian hits against a bumper at a vehicle's front end first and then may hit against an engine hood covering a vehicle's engine room again as a secondary collision. Therefore, some countermeasure for lightening an impact of the secondary collision has been conventionally applied to the engine hood in order to protect the pedestrian.

In case the pedestrian collides with the bumper, for example, a pedestrian having a small body size tends to hit against a front end portion of the engine hood covering the engine room as the secondary collision, while a pedestrian having a large body size tends to hit against a rear end portion of the engine hood as the secondary collision. Accordingly, vehicles have been recently equipped with the engine hood which has some area for protection (hereinafter, referred to as a "protection area") to lighten the impact of the secondary collision at its front end portion and its rear end portion.

The above-described protection area is generally arranged at a position which is a specified length away from the ground surface right below the front end of the vehicle. For example, in a vehicle which has a relatively low vehicle height, like a sports car, the protection area at the rear end portion of the engine hood is located near an upper portion of a cowl box which is provided at a dash panel partitioning the engine room from a vehicle compartment beyond a rear end of the engine room.

Japanese Patent Laid-Open Publication No. 2004-338528, for example, discloses a hood device for a vehicle, in which actuators are provided at the front and rear end portions of the hood, which lift the hood upwardly, and a bumping member projects rearwardly at a collision.

In general, the cowl box stores hard things, such as a wiper device, so it may be necessary that the cowl box is covered with the engine hood. Herein, in the hood device for a vehicle in which the hood is lifted up and at the same time the bumping member provided inside the hood projects rearwardly so as to cover the cowl box, like the one disclosed in the above-described publication, the bumping member absorbs the impact through its deformation. Therefore, it cannot be said that this hood device performs an impact absorption by utilizing a crash stroke which may be made by lifting up the engine hood upwardly.

SUMMARY OF THE INVENTION

The present invention has been devised in view of the above-described matter, and an object of the present invention is to provide a pedestrian protection device for a vehicle which can effectively reduce the impact of the secondary collision at a rear end portion of the engine room.

According to the present invention, there is provided a pedestrian protection device for a vehicle, which is provided at a front portion of a vehicle body which comprises an engine room, a cowl box which is provided at an upper portion of a dash panel partitioning the engine room from a vehicle compartment, and extends in a vehicle width direction, and an engine hood which is pivotally supported at the vehicle body via a first hinge provided at a rear end portion thereof so as to cover over the engine room, wherein the pedestrian protection device comprises an engine-hood guide mechanism which guides the engine hood upwardly and rearwardly so as to cover at least part of the cowl box when a collision of a pedestrian against a front end portion of the vehicle body is detected or predicted, and lowers the engine hood downwardly when a load acting on the engine hood exceeds a specified load.

According to the above-described invention, the engine-hood guide mechanism provided at the front portion of the vehicle body guides upwardly the engine hood pivotally supported at the vehicle body at its rear end when the collision of the pedestrian against the front end portion of the vehicle body is detected or predicted. Thereby, a specified stroke, i.e., a specified space, to absorb the impact from the secondary collision can be properly provided between the engine hood and the vehicle body prior to the secondary collision of the pedestrian with the engine hood, without positioning the engine hood at an improperly high level. Further, since the engine-hood guide mechanism guides the engine hood not only upwardly but rearwardly, the engine hood is moved rearwardly, keeping the specified stroke from the vehicle body, and covers the cowl box storing the hard things. Moreover, since the engine-hood guide mechanism lowers the engine hood downwardly when the load acting on the engine hood exceeds the specified load, the impact can be properly absorbed. Thus, even in case the protection area against the secondary collision is arranged on the rear side of the engine room, the impact can be properly absorbed with the engine hood lowering, by utilizing positively the specified stroke provided between the engine hood and the vehicle body, so that the impact of the secondary collision can be reduced effectively.

According to an embodiment of the present invention, the engine-hood guide mechanism comprises an actuator which moves the engine hood upwardly and a move mechanism which moves the engine hood rearwardly as the engine hood rises. Thereby, when the collision of the pedestrian against the front end portion of the vehicle body is detected or predicted, the engine hood can be promptly moved upwardly with a simple structure using the actuator. Further, the engine hood can be moved rearwardly with a rising force applied to the engine hood by using the move mechanism. Thus, the specified stroke provided between the engine hood and the vehicle body can be properly ensured at the collision of the pedestrian with the front end portion of the vehicle body, and at least part of the cowl box can be covered with the engine hood. Accordingly, the impact of the secondary collision can be surely reduced by utilizing the stroke provided between the engine hood and the vehicle body.

According to another embodiment of the present invention, a striker is provided at a front end portion of the engine hood, a latch to engage with the striker to secure a closing state of the engine hood is provided at the vehicle body, and the actuator comprises a releasing device to release an engagement of the striker and the latch in accordance with an operation of the actuator. Thereby, since the engagement between the striker and the latch is released promptly when the collision of the pedestrian against the front end portion of the vehicle body is detected or predicted, the engine hood can be moved upwardly and rearwardly promptly.

According to another embodiment of the present invention, a move-amount adjusting portion to adjust the amount of upward-and-rearward move of the engine hood is provided at a portion of the engine hood which is located between the move mechanism and the striker in a vehicle longitudinal direction, and the move-amount adjusting portion allows a rotation of the engine hood when the engine hood rotates around the rear end portion of the engine hood, and restricts an excessive move of the engine hood when the engine hood is moved upwardly and rearwardly. Thereby, since the move-amount adjusting portion allows the rotation of the engine hood when the engine hood rotates around the rear end portion of the engine hood, the proper operation of the engine hood can be provided at a normal state. Further, since the move-amount adjusting portion restricts the rearward excessive move of the engine hood, the engine hood can be prevented from colliding with the windshield, for example.

According to another embodiment of the present invention, the engine-hood guide mechanism is positioned near a rear end of the engine room, the move-amount adjusting portion is positioned near a front end of the engine room, a restriction member is provided at the vehicle body at a position corresponding to the move-amount adjusting portion so as to rotate around a pivotal axis extending in the vehicle width direction between a forward-falling state and an upward-rising state, and the restriction member engages with the move-amount adjusting portion when the engine hood is moved upwardly and rearwardly so as to have the upward-rising state. Thereby, since the restriction member has the upward-rising state in accordance with the move of the engine hood, the engine hood is supported by the restriction member and the engine-hood guide mechanism at its front and rear. Further, the specified stroke provided between the engine hood and the vehicle body can be ensured along the whole length of the engine hood in the vehicle longitudinal direction by the restriction member having a specified length.

According to another embodiment of the present invention, the engine hood is coupled to the vehicle body via the move mechanism, the move mechanism comprises a first hinge, a second hinge which rotatably connects the move mechanism and the engine hood, and an engaging portion which engages with the engine hood so as to restrict a rotation of the second hinge, and the engaging portion is configured such that an engagement thereof with the engine hood is released when an upward force by the actuator acts on the engine hood. Thereby, since the rotation of the engine hood around the second hinge is restricted by the engaging portion at the normal state, the engine hood is opened or closed around the first hinge. When the engagement between the engaging portion and the engine hood is released by the actuator, the engine hood is moved upwardly and rearwardly by using the rotations around the first and second hinges. Further, since the opening/closing of the engine hood at the normal state is conducted with the first hinge which constitutes the move mechanism, the number of parts is made properly small. Accordingly, the engine hood can be moved rearwardly with the rising force applied to the engine hood by the actuator with a simple structure, aiming at the weight reduction and facilitation of manufacturing of the vehicle.

According to another embodiment of the present invention, the move mechanism comprises a weak portion which causes a bucking deformation of the move mechanism when the load acting on the engine hood exceeds the specified load. Thereby, since the weak portion causes the bucking deformation of the move mechanism when the load acting on the engine hood exceeds the specified load, the kinetic energy of the pedestrian caused by the secondary collision can be transferred to the deformation energy of the move mechanism and absorbed properly. Accordingly, the impact of the secondary collision of the pedestrian can be surely reduced by using the specified stroke provided between the engine hood and the vehicle body. Further, even in case the pedestrian hits against a hard portion which supports the engine hood, i.e., a portion of the engine hood near the engine-hood guide mechanism, at the secondary collision, the move mechanism has the bucking deformation at the weak portion so quickly that the impact of the secondary collision can be reduced.

According to another embodiment of the present invention, the move mechanism comprises a link member which has the engaging portion, connects the first hinge and second hinge, and maintains a space which is formed between the engine hood and the cowl box until the load acting on the engine hood exceeds the specified load when the engagement with the engine hood is released, and the link member has a weak portion which causes a bucking deformation of the move mechanism. Thereby, since the move mechanism comprises the link member and the link member has the weak portion causing the bucking deformation of the move mechanism, the space formed between the engine hood and the cowl box is maintained by the link member until the load acting on the engine hood exceeds the specified load, and the buckling deformation of the move mechanism is promoted when the load exceeds the specified load. Accordingly, the kinetic energy of the pedestrian caused by the secondary collision can be transferred to the deformation energy of the move mechanism and absorbed properly. Accordingly, the impact of the secondary collision can be more surely reduced by effectively using the specified stroke provided between the engine hood and the vehicle body.

According to another embodiment of the present invention, the cowl box supports a lower end of a windshield, both-side edges of which are supported at front pillars, and the engine-hood guide mechanism guides the engine hood upwardly and rearwardly so as to cover at least lower end portions of the front pillars. Thereby, since the engine-hood guide mechanism guides the engine hood upwardly and rearwardly so as to cover at least lower end portions of the front pillars, the secondary collision of the pedestrian with the front pillar having a relatively high rigidity can be prevented properly.

According to another embodiment of the present invention, a wiper device is arranged inside the cowl box, and the engine hood is moved upwardly and rearwardly so as to cover the wiper device. Thereby, even in a vehicle in which the arrangement position of the engine hood is relatively low and the cowl box is relatively shallow, since the engine hood is moved upwardly and rearwardly so as to cover the wiper device, the secondary collision of the pedestrian with the wiper device can be prevented properly, without making the depth of the cowl box greater.

According to another embodiment of the present invention, the pedestrian protection device for a vehicle further comprises an impact lightening means which is provided at a front end portion of the engine hood and/or the front end portion of the vehicle body so as to lighten an impact of a secondary collision of the pedestrian with the front end portion of the engine hood. Thereby, the impact of the secondary collision of the pedestrian with the front end portion of the engine hood which has been moved upwardly can be reduced properly.

According to another embodiment of the present invention, the impact lightening means comprises a deformation causing portion which is formed at the front end portion of the engine hood so as to make a tip of the engine hood deform downwardly when a load is inputted to the front end portion of the engine hood. Thereby, since the kinetic energy of the pedestrian caused by the secondary collision is transformed to the downward deformation energy of the tip of the engine hood, the impact of the secondary collision of the pedestrian with the tip of the engine hood can be reduced properly.

According to another embodiment of the present invention, the impact lightening means comprises a tip of the engine hood which is formed so as to extend downwardly. Thereby, since the direct contact of the pedestrian with the tip of the engine hood can be avoided, the protection of the pedestrian against the collision with the vehicle can be properly achieved.

According to another embodiment of the present invention, the impact lightening means comprises a cover member which covers at lest part of a space formed between the engine hood and the vehicle body in front of the engine room in accordance with the engine hood moving upwardly. Thereby, since the pedestrian is prevented from coming into the engine room by the cover member, the secondary collision of the pedestrian with the engine in the engine room can be avoided properly.

According to another embodiment of the present invention, the cover member comprises an expandable curtain member or an inflatable airbag. Thereby, the prevention of the pedestrian from coming into the engine room can be properly achieved.

Other features, aspects, and advantages of the present invention will become apparent from the following description which refers to the accompanying drawings.

DETAILED DESCRIPTION OF THE INVENTION

Figure 1:
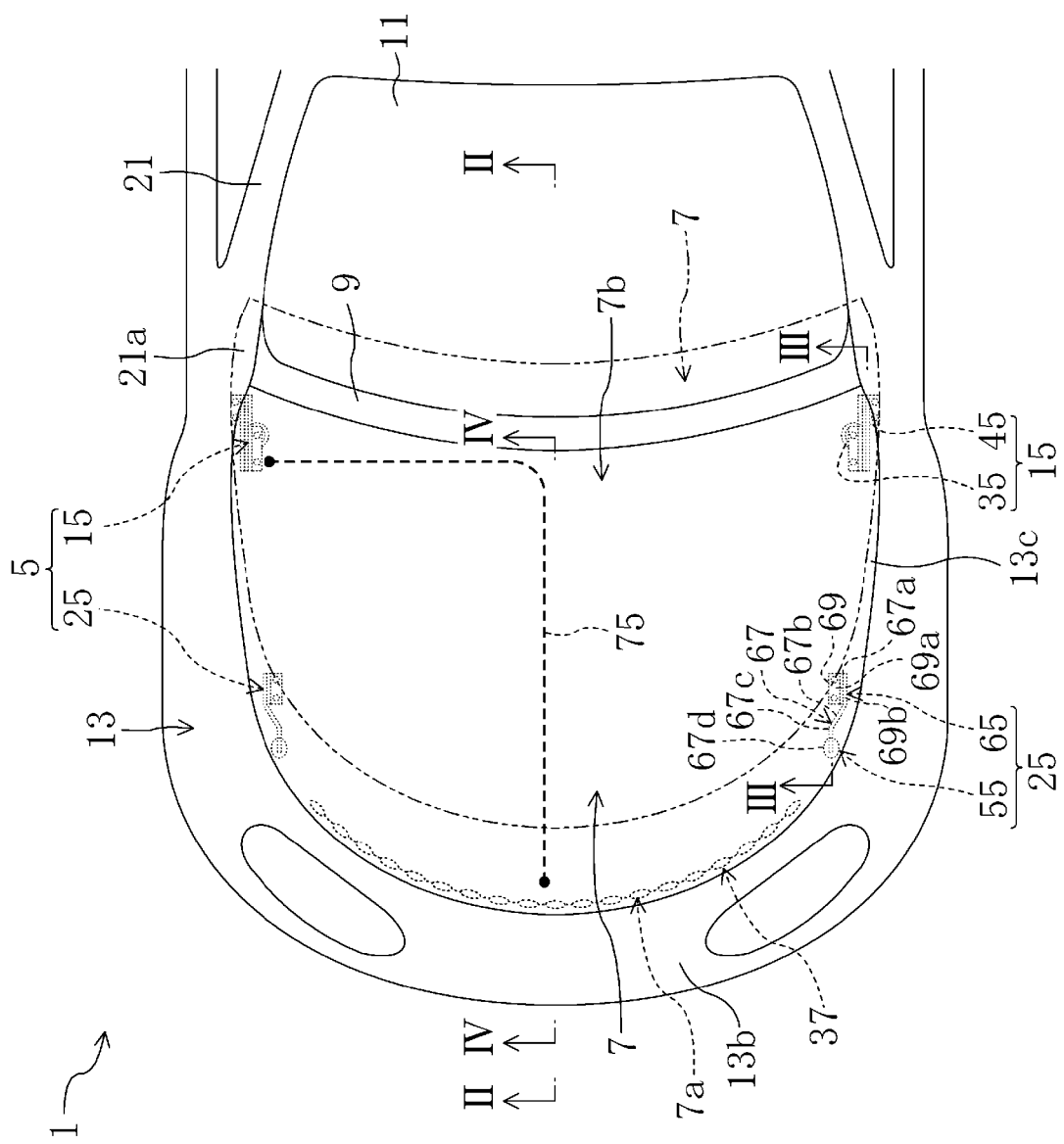
FIG. 1 is a plan view of a front portion of a vehicle body of a vehicle according to a first embodiment of the present invention.
Figure 2:
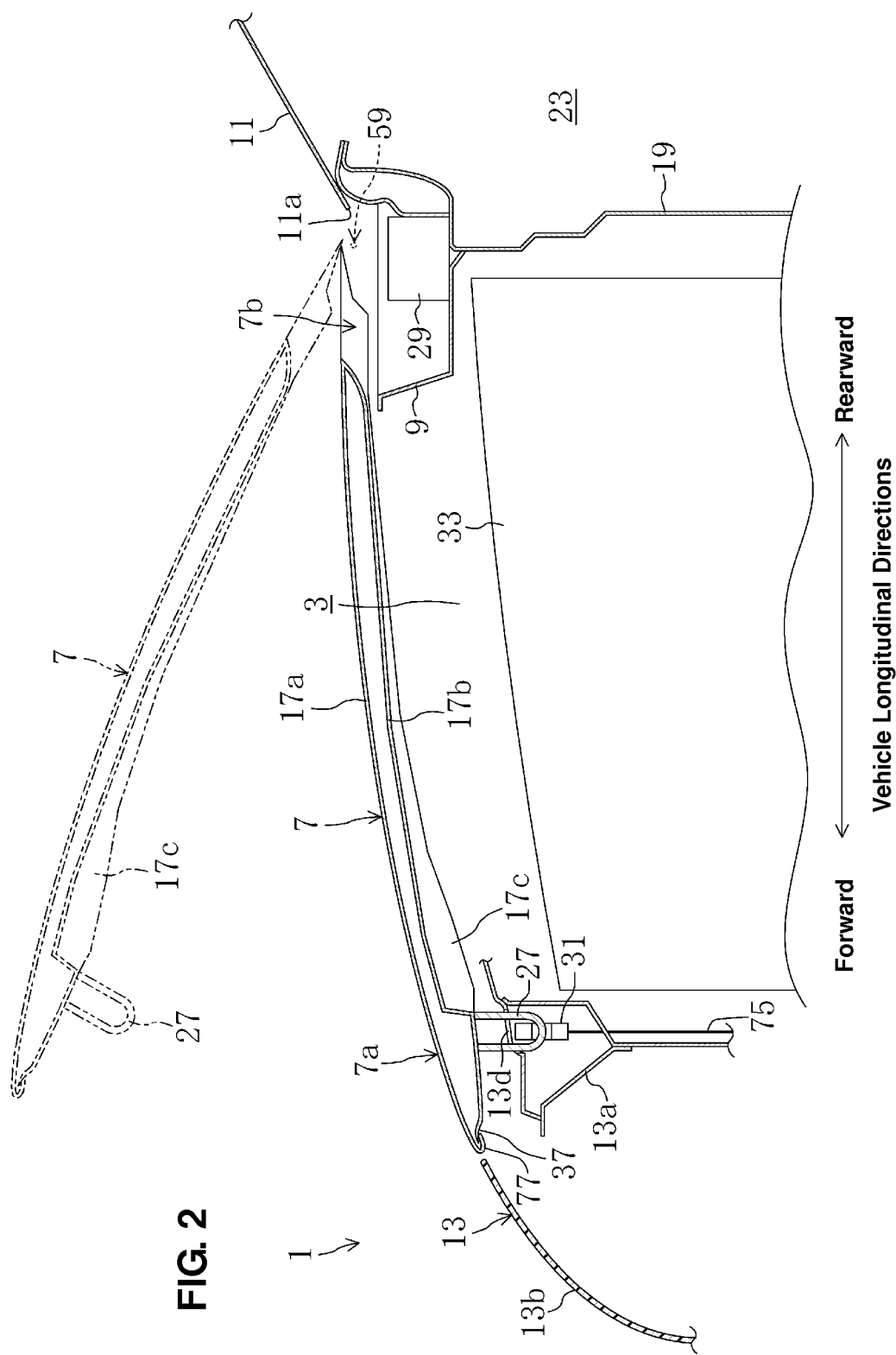
FIG. 2 is a sectional view taken along line II-II of FIG. 1.

Hereinafter, preferred embodiments of the present invention will be described referring to the accompanying drawings.
Embodiment 1
-Structure of Front Portion of Vehicle Body-
FIG. 1 is a plan view of a front portion of a vehicle body of a vehicle equipped with a pedestrian protection device for a vehicle according to a first embodiment of the present invention. FIG. 2 is a sectional view taken along line II-II of FIG. 1. A vehicle 1, at a front portion of a vehicle body 13 (hereinafter, referred to as "vehicle body" sometimes), comprises an engine room 3 in which an engine 33 is stored, a cowl box 9 which is provided at an upper portion of a dash panel 19 which partitions the engine room 3 from a vehicle compartment 23, and an engine hood 7 which covers over the engine room 3 as shown in FIGS. 1 and 2.

The cowl box 9 extends in a vehicle width direction and supports a lower end of a windshield 11 over its whole width. A wiper device (for example, comprising a motor and a cam mechanism of a wiper drive device) 29 is arranged inside the cowl box 9. Front pillars 21, 21 are provided at both side edges of the windshield 11. Lower end portions 21a, 21a of the front pillars 21, 21 are positioned onto both end portions of the cowl box 9.

The engine hood 7 is coupled to the vehicle body 13 via first hinges 59. More specifically, a rear end portion 7b of the engine hood 7 is rotatably supported at the vehicle body 13 via a move mechanism 45, which will be described later, including the first hinge 59, which is provided near the end portion of the cowl box 9.

The engine hood 7 is formed by an outer panel 17a which forms an outer face of the vehicle 1 and an inner panel 17b which forms an inner face on the side of the engine room 3, which are joined together. The inner panel 17b has some convex portions, bending portions and so on. Reference character 17c in FIG. 2 denotes outward convex portions which are formed at both end portions of the inner panel 17b and extend in a vehicle longitudinal direction.

A striker 27 is provided at a front end portion 7a of the engine hood 7. A latch 31 which engages with the striker 27 to secure a closing state of the engine hood 7 is provided at an opening portion 13d which is formed at a shroud member (vehicle body) 13a in front of the engine room 3.

A manual operation of releasing the engagement between the striker 27 and the latch 31 can provide an opening state of the engine hood 7 as shown by a two-dotted broken line in FIG. 2 in such a manner that the engine hood 7 is opened around the rear end portion 7b so that the engine room 3 can be exposed at its normal state (except when the collision of the pedestrian with a front bumper face (a front end portion of the vehicle body 13) 13b is detected or predicted, which will be described). Meanwhile, a manual operation of pushing down the engine hood 7 and thereby engaging the striker 27 with the latch 31 can provide a closing state of the engine hood 7 so that the engine room 3 can be closed.

-Structure of Pedestrian Protection Device for Vehicle-

At the front portion of the vehicle body 13 is provided a pedestrian protection device 5 which may lighten the impact of the secondary collision of the pedestrian who has hit against the front bumper face 13b with the engine hood 7 first. The pedestrian protection device 5 comprises, as shown in FIG. 1, a pair of engine-hood guide mechanisms 15, 15 which guides the engine hood 7 upwardly and rearwardly so as to cover at least part of the cowl box 9 when the collision of the pedestrian against the front bumper face 13b is detected or predicted, and lowers the engine hood 7 downwardly when a load acting on the engine hood 7 exceeds a specified load. The pedestrian protection device 5 further comprises a pair of move-amount adjusting portions 25, 25 which adjusts the amount of upward-and-rearward move of the engine hood 7, and an impact lightening means 85 which is provided at the front end portion 7a of the engine hood 7 and lightens the impact inputted to the front end of the engine hood 7.

The engine-hood guide mechanisms 15, 15 are provided at portions near the rear end of the engine room 3, more specifically, at the both end portions of the cowl box 9, respectively. Each of the engine-hood guide mechanisms 15, 15 comprises an actuator 35 which moves the engine hood 7 upwardly, and a move mechanism 45 which moves the engine hood 7 rearwardly as the engine hood 7 rises.

The actuator 35 comprises a cylinder having a bottom 35a which is supported by being inserted into a hole 9b formed at the cowl box 9, a rod 35b which moves the engine hood 7 upwardly by being inserted into the cylinder 35a and having its upper end contact the lower face of the inner panel 17b, and an inflator (not illustrated) which is provided at the bottom of the cylinder 35a and generates gas to lift the rod 35b.

This actuator 35 is electrically coupled to a CPU, installed in the vehicle 1. The CPU produces an ignition signal when the collision of the pedestrian with the front bumper face 13b is detected or predicted. This ignition signal enables an ignition portion of the inflator to ignite to make a gas generation source generate lots of gas, and the rod 35b is lifted by the generated gas.

More specifically, the vehicle 1 is equipped with a collision predicting sensor which predicts the collision of the pedestrian by measuring the distance to the pedestrian and calculating the collision possibility based on the speed, the estimated braking distance, and the like of the vehicle 1, and a collision detecting sensor which detects the collision of the pedestrian with the front bumper face 13b. The CPU produces the ignition signal for the actuator 35 based on the information inputted from the above-described collision predicting sensor and collision detecting sensor. Herein, the collision predicting sensor may be comprised of a supersonic sensor, radar, CCD camera, or the like, and the collision predicting sensor may be comprised of a G sensor, pressure sensitive sensor, or the like.

Figure 4:
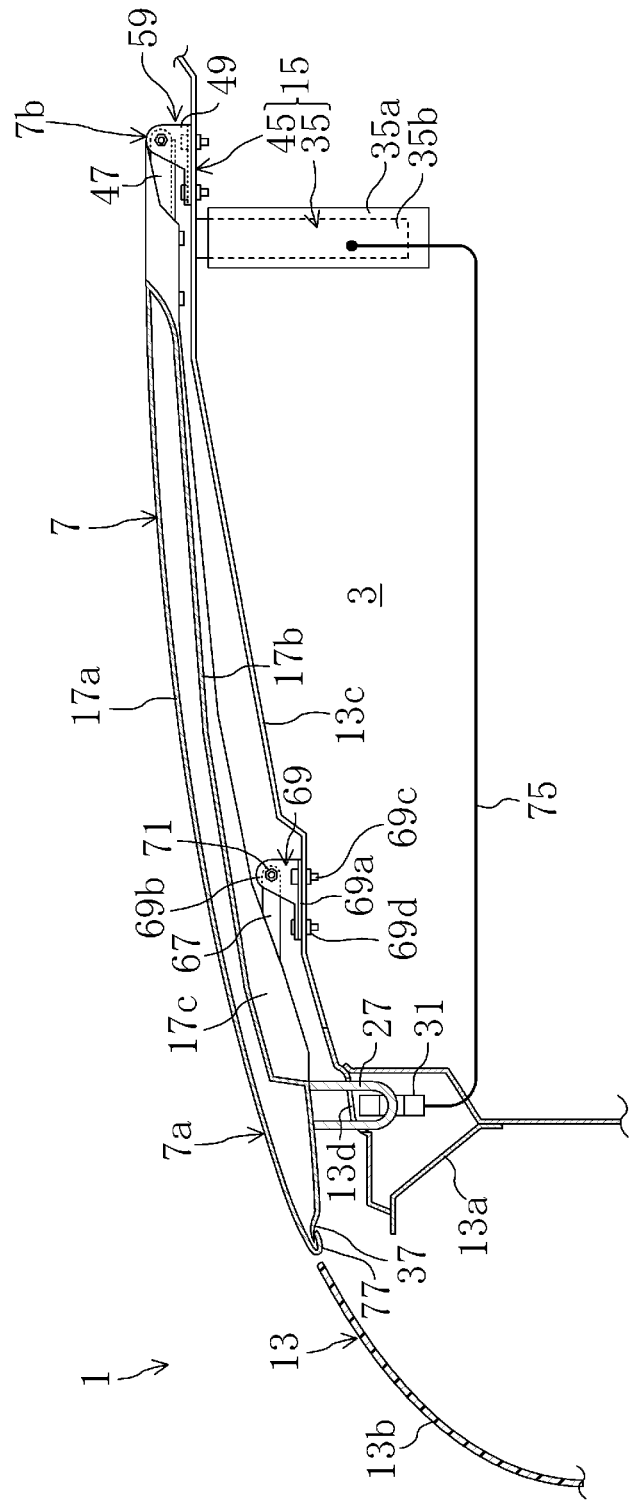
FIG. 4 is a sectional view taken along line IV-IV of FIG. 1.

The actuator 35, as shown in FIGS. 1 and 4, comprises a cable 75 as a releasing means for releasing the engagement between the striker 27 and the latch 31 in accordance with the operation of the actuator 35. This cable 75 interconnects a lower end portion of the latch 31 and a lower end of the rod 35b of the actuator 35, and is provided inside the engine room 3 in its state having a tension, without interfering with the engine 33 and others. When the rod 35b of the actuator 35 rises, the latch 31 is pulled down by the cable 75, so that the engagement with the striker 27 is released and the fixing of the front end portion 7a of the engine hood 7 is released promptly.

Herein, after the engine hood 7 has been moved upwardly, the rod 35b contacts the engine hood 7 which has lowered naturally or at the secondary collision, and thereby the rod 35b lowers into the cylinder 35a.

Figure 5:
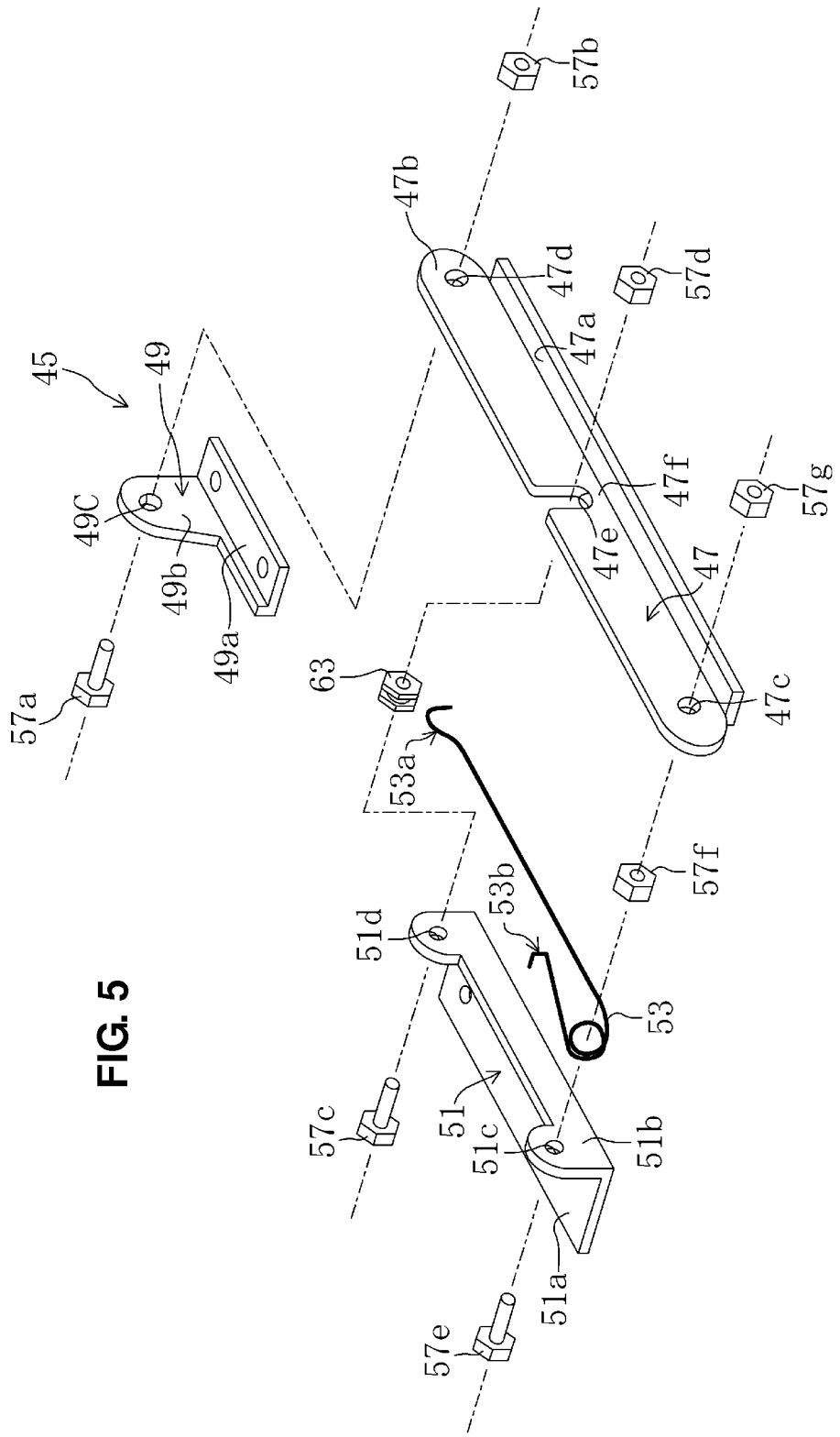
FIG. 5 is an exploded perspective view of a move mechanism.
Figure 6:
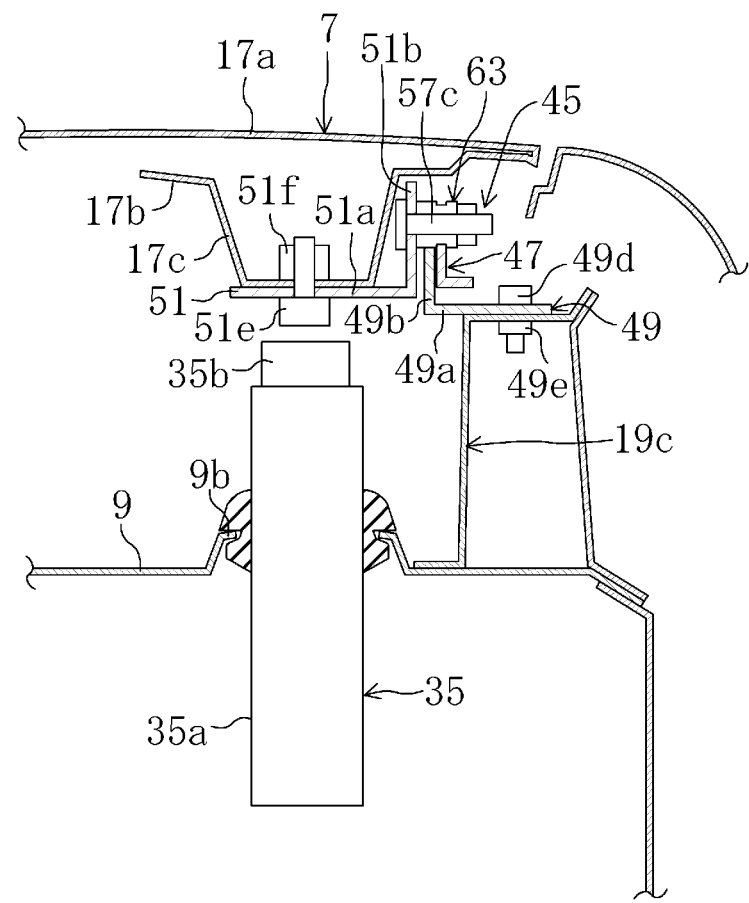
FIG. 6 is a sectional view taken along line VI-VI of FIG. 3.
Figure 7:
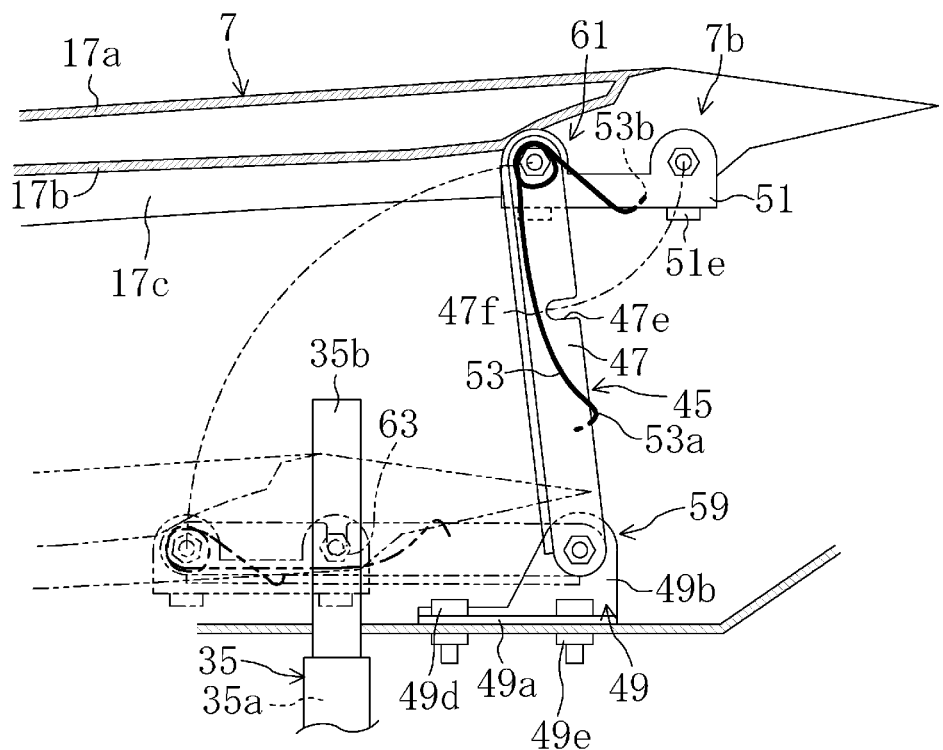
FIG. 7 is a diagram schematically explaining a move of an engine-hood guide mechanism.

The move mechanism 45 comprises, as shown in FIGS. 5 through 7, a first bracket 49 which is attached to the vehicle body 13, a second bracket 51 which is attached to the engine hood 7, a link member 47 which connects the both brackets 49, 51, a torsion spring 53 which applies a biasing force to the second bracket 51 and the link member 47, and a spacer with groove 63 which make the second bracket 51 engages with the link member 47.

The first bracket 49 has an L-shaped cross section, comprising a bottom wall portion 49a which has two attaching holes and a vertical wall portion 49b which extends upwardly from an inside end portion of the bottom wall portion 49a and has a rivet insertion hole 49c. The first bracket 49 is attached to the vehicle body 13 by fixing the bottom wall portion 49a to an upper end of a cowl panel 19c, which has a rectangular cross section and is attached onto the end portion of the cowl box 9, with bolts and nuts 49d, 49e . . . .

The second bracket 51 has an L-shaped cross section, comprising a bottom wall portion 51a which has two attaching holes and a vertical wall portion 51b which extends upwardly from an outside end portion of the bottom wall portion 51a and has a rivet insertion hole 51c and a bolt insertion hole 51d. The second bracket 51 is attached to the engine hood 7 by fixing the bottom wall portion 51a to a lower end of an outside convex portion 17c of the inner panel 17b with bolts and nuts 51e, 51f . . . .

The link member 47 has an L-shaped cross section, comprising a bottom wall portion 47a and a vertical wall portion 47b which extends upwardly from an inside end portion of the bottom wall portion 47a and has front and rear rivet insertion holes 47c, 47d at its front and rear end portions. At the central portion of the vertical wall portion 47b of the link member 47 are formed an engaging portion 47e which has an upward-opening notch and a weak portion 47f which has a narrow width due to the forming of the engaging portion 47e. Herein, this weak portion 47f is configured to cause a bucking deformation of the link member 47 when the load acting on the engine hood 7 exceeds a specified load in case the link member 47 stands upright and supports the engine hood 7. In other words, the link member 47 maintains the space formed between the engine hood 7 and the cowl box 9 until the load acting on the engine hood 7 exceeds the specified load.

The rear end portion of the link member 47 is pivotally connected to the first bracket 49. More specifically, a rivet 57a is inserted through the rivet insertion hole 49a of the first bracket 49 and the rear rivet insertion hole 47d of the link member 47 and fixed with a nut 57b, so that the link member 47 rotates relative to the first bracket 49 around a shaft portion of the rivet 57a. Herein, the first hinge 59 of the present invention corresponds to the link member 47, first bracket 49, rivet 57a, and nut 57b.

Meanwhile, the front end portion of the link member 47 is pivotally connected to the second bracket 51. More specifically, a rivet 57e is inserted through the rivet insertion hole 51c of the second bracket 51, a coil portion of the torsion spring 53, a spacer 57f, and the front rivet insertion hole 47c of the link member 47 and fixed with a nut 57g, so that the link member 47 rotates relative to the second bracket 51 around a shaft portion of the rivet 57e. Herein, the first hinge 61 of the present invention corresponds to the link member 47, second bracket 51, torsion spring 53, spacer 57f, rivet 57e, and nut 57g.

One arm portion 53a of the torsion spring 53 engages with an upper edge of the vertical wall portion 47b of the link member 47, and the other arm portion 53b engages with a lower face of the bottom wall portion 51a of the second bracket 51. Accordingly, the biasing force of the torsion spring 53 is applied to the link member 47 and the second bracket 51 so that these members 47, 51 rotate around the shaft portion of the rivet 57e so as to form a V-shaped opening.

Thus, since the link member 47 is connected to the vehicle body 13 so as to rotate around the shaft portion of the rivet 57a, and also connected to the engine hood 7 so as to rotate around the shaft portion of the rivet 57e, the engine hood 7 is moved rearwardly as shown in FIG. 7 in accordance with the length and inclination angle of the link member 47 when the engine hood is moved upwardly.

Meanwhile, the central portion of the link member 47 is detachably connected to the second bracket 51. More specifically, the link member 47 is detachably connected to the second bracket 51 by putting the engaging portion 47d, with some pressure, into a groove portion of the spacer with groove 63 which is fixed to the rear end portion of the second bracket 51 with the bolt 57c inserted into the bolt insertion hole 51d of the second bracket 51 and the nut 57d.

The spacer with groove 63 is made from resilient resin (or, the resin is applied to the groove portion of the spacer with groove 63). This spacer 63 engages with the engaging portion 47e of the link member 47 against the biasing force of the torsion spring 53 at the normal state. Meanwhile, when the upward force caused by the actuator 35 acts on the engine hood 7, the engagement of the spacer 63 with the engine hood 7 is released. In other words, at the normal state, the engaging portion 47e engages with the engine hood 7 via the spacer with groove 63, so that the rotation around the second hinge 61 is restricted and thereby the link member 47 is fixed relative to the engine hood 7 so as to extend in parallel to the outside convex portion 17c. Meanwhile, when the collision of the pedestrian against the front bumper face 13b is detected or predicted, releasing the engaging portion 47e from the spacer with groove 63 allows the rotation around the second hinge 61.

Figure 3:
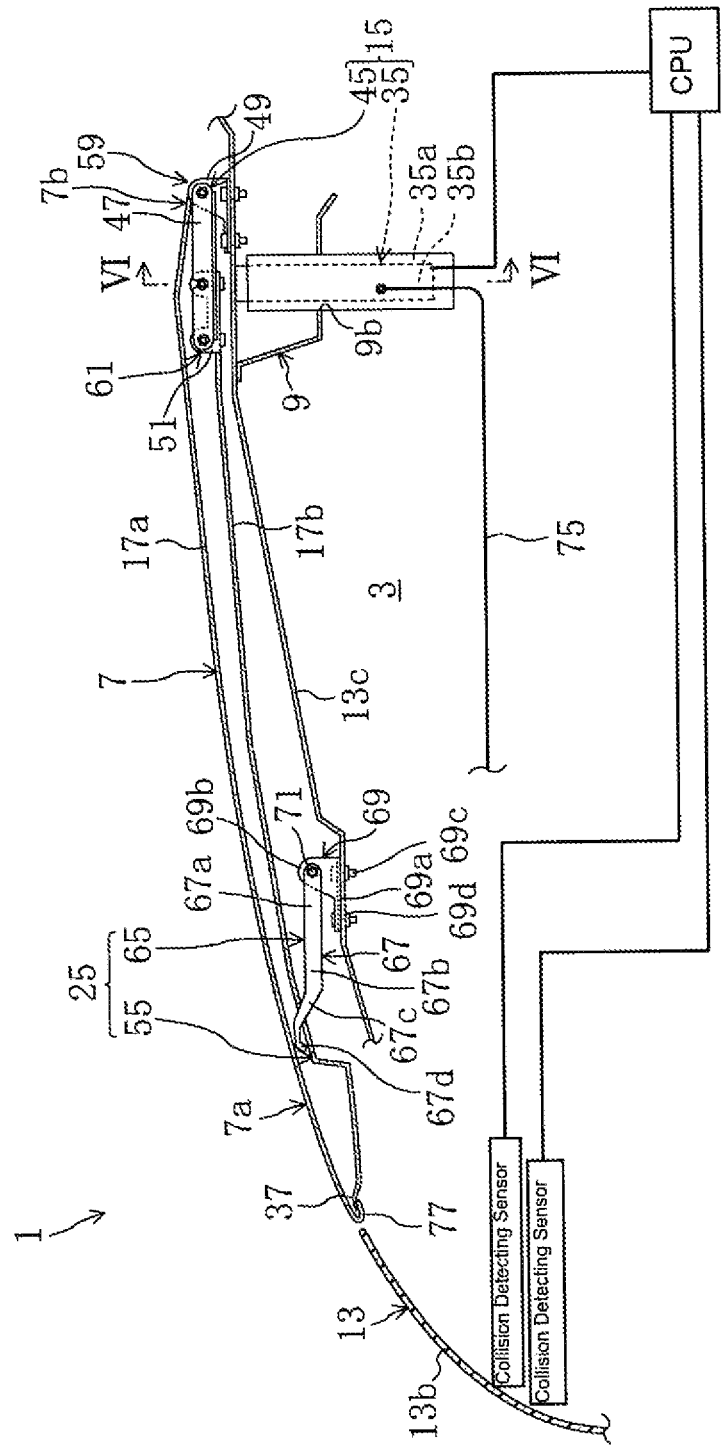
FIG. 3 is a sectional view taken along line III-III of FIG. 1.

Meanwhile, the above-described move-amount adjusting portions 25, 25 are arranged between the move mechanisms 45 and the striker 27 in the vehicle longitudinal direction, specifically, near front end of the engine room 3. Each move-amount adjusting portion 25 comprises, as shown in FIGS. 1 and 3, a move-amount adjusting portion 55 which is provided at the engine hood 7 and a move-amount restricting portion 65 which is provided at the vehicle body 13 so as to correspond to the move-amount adjusting portion 55.

The move-amount restricting portion 65 comprises a bracket 69 which is attached to the vehicle body 13 and a restriction member 67 which is pivotally supported at the bracket 69.

The bracket 69 has an L-shaped cross section, comprising a bottom wall portion 69a which has two attaching holes and a vertical wall portion 69b which extends upwardly from an outside end portion of the bottom wall portion 69a and has a rivet insertion hole. The bracket 69 is attached to the vehicle body 13 by fixing the bottom wall portion 69a to an upper end of a side member (vehicle body) 13c beside the engine room 3 with bolts and nuts 69c, 69d . . . .

Each restriction member 67 is a narrow plate member having a specified length, and comprises a base end portion 67a which extends in the vehicle longitudinal direction at the normal state, a middle portion 67b which inclines inwardly from a front end of the based end portion 67a to the vehicle front, a tip portion 67c which inclines upwardly from a front end of the middle portion 67b to the vehicle front, and a hook-shaped engaging portion 67d which is formed at the tip portion 67c.

A rear end portion of the base end portion 67a is pivotally supported at the bracket 69 via a rivet 71 which is inserted into the rivet insertion hole of the vertical wall portion 69b of the bracket 69. Thus, each restriction member 67 rotates around the shaft portion of the rivet 71 (around an axis extending in the vehicle width direction) between its forward-falling state and its upward-rising state.

The above-described move-amount adjusting portion 55 is a through hole which is formed at a position of the inner panel 17b of the engine hood 7 which corresponds to the engaging portion 67d of the restriction member 67. The engaging portion 67d of the restriction member 67 penetrates the move-amount adjusting portion 55 and is stored in the space between the outer panel 17a and the inner panel 17b when the engine hood 7 is closed.

The size of the move-amount adjusting portion 55 is configured so that the rotation of the engine hood 7 is allowed when the engine hood 7 is opened so as to rotate around the rear end portion 7b by the first hinge 59, that is, the engaging portion 67d of the restriction member 67 does not hook. Further, the size of the move-amount adjusting portion 55 is configured so that an excessive move of the engine hood 7 is restricted when the engine hood 7 is moved upwardly and rearwardly, that is, the engaging portion 67d of the restriction member 67 hooks. In case the restriction member 67 engages with the move-amount adjusting portion 55 when the engine hood 7 is moved upwardly and rearwardly, the restriction member 67 takes the upward-rising state in accordance with the move of the engine hood 7.

A deformation causing portion 37 as the impact lightening means 85 is formed at the front end portion 7a of the engine hood 7 along the front end of the engine hood 7 over the whole width of the engine hood 7 as shown in FIG. 1. This deformation causing portion 37 is configured to make a portion (hemming portion 77) before the deformation causing portion 37 downwardly when the load is inputted to the front end of the engine hood 7.

Figure 11:
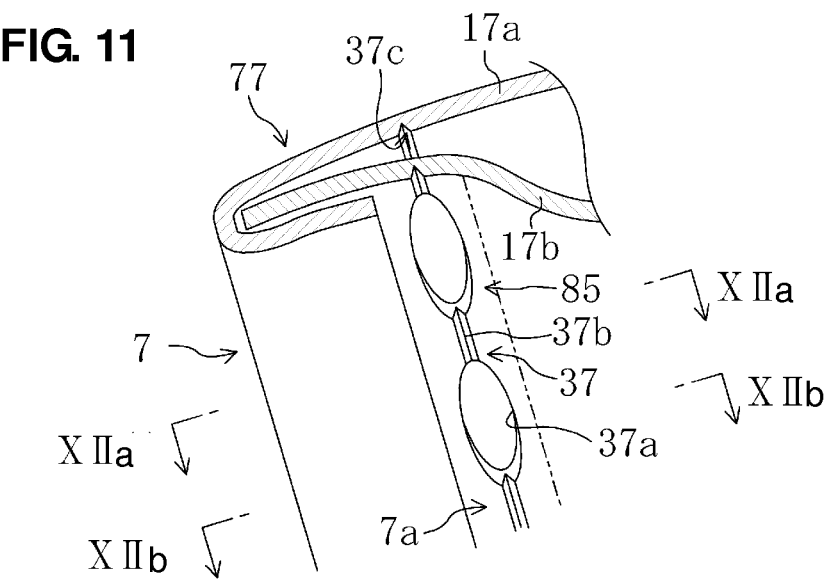
FIG. 11 is a perspective view schematically showing a deformation causing portion.
Figure 12A:
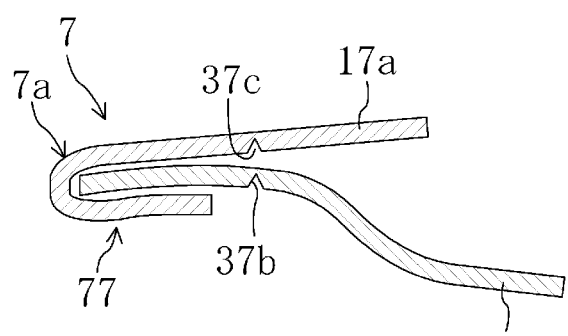
FIG. 12A is a sectional view taken along line XIIa-XIIa of FIG. 11.
Figure 12B:
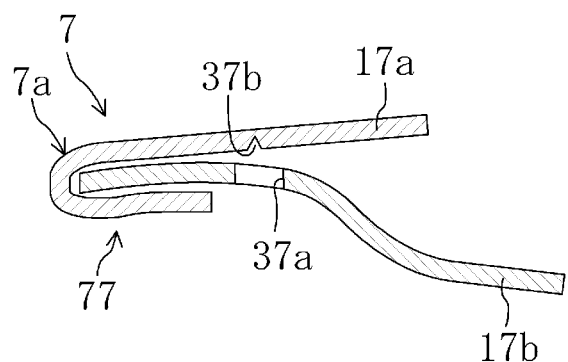
FIG. 12B is a sectional view taken along line XIIb-XIIb of FIG. 11.

More specifically, the deformation causing portion 37 is comprised of portions of the outer panel 17a and the inner panel 17b which are located right after the hemming portion 77 having a high rigidity, which is formed by joining the outer panel 17a and the inner panel 17b in a state in which a tip of the inner panel 17b is put between the outer panel 17a and its tip turned back as shown in FIGS. 11 and 12.

At this portion 37 of the inner panel 17b are formed plural overall through holes 37a whose have their long axes located in the vehicle width direction. Between the through holes 37a, 37a are formed shallow V-shaped notches 37b which interconnect ends of the long axes of these holes 37a, 37a. Meanwhile, at the deformation causing portion 37 of the outer panel 17a are formed shallow V-shaped notches 37c which are positioned above the through holds 37a and the notches 37b of the inner panel 17b and formed over the whole width of the engine hood 7.

Forming the plural through holes 37a, 37a . . . at the inner panel 17b and the notches 37b, 37c . . . at the outer panel 17a and the inner panel 17b makes the front end portion 7a of the engine hood 7 deform easily. Further, forming the deformation causing portion 37 over the whole width of the engine hood 7 makes the hemming portion 77 deform downwardly with a starting point of this portion 37 when the pedestrian who have hit against the front bumper face 13b collides with the front end of the engine hood 7 as the secondary collision. Accordingly, the kinetic energy of the pedestrian can be transferred to the deformation energy of the engine hood 7 and absorbed properly.

-Operation of Pedestrian Protection Device for Vehicle-

First, when the driver or someone operates the latch 31 in the normal state (when the collision of the pedestrian with front bumper face 13b is not detected or predicted), the engagement between the striker 27 and the latch 37 is released. Herein, since the link member 47 is fixed to the engine hood 7 so as to extend in parallel to the outside convex portion 17c by the engaging portion 47e of the link member 47 engaging with the spacer with groove 63, the engine hood 7 is made as if the rear end portion 7b is connected to the vehicle body 13 directly via the first hinge 59.

Figure 8:
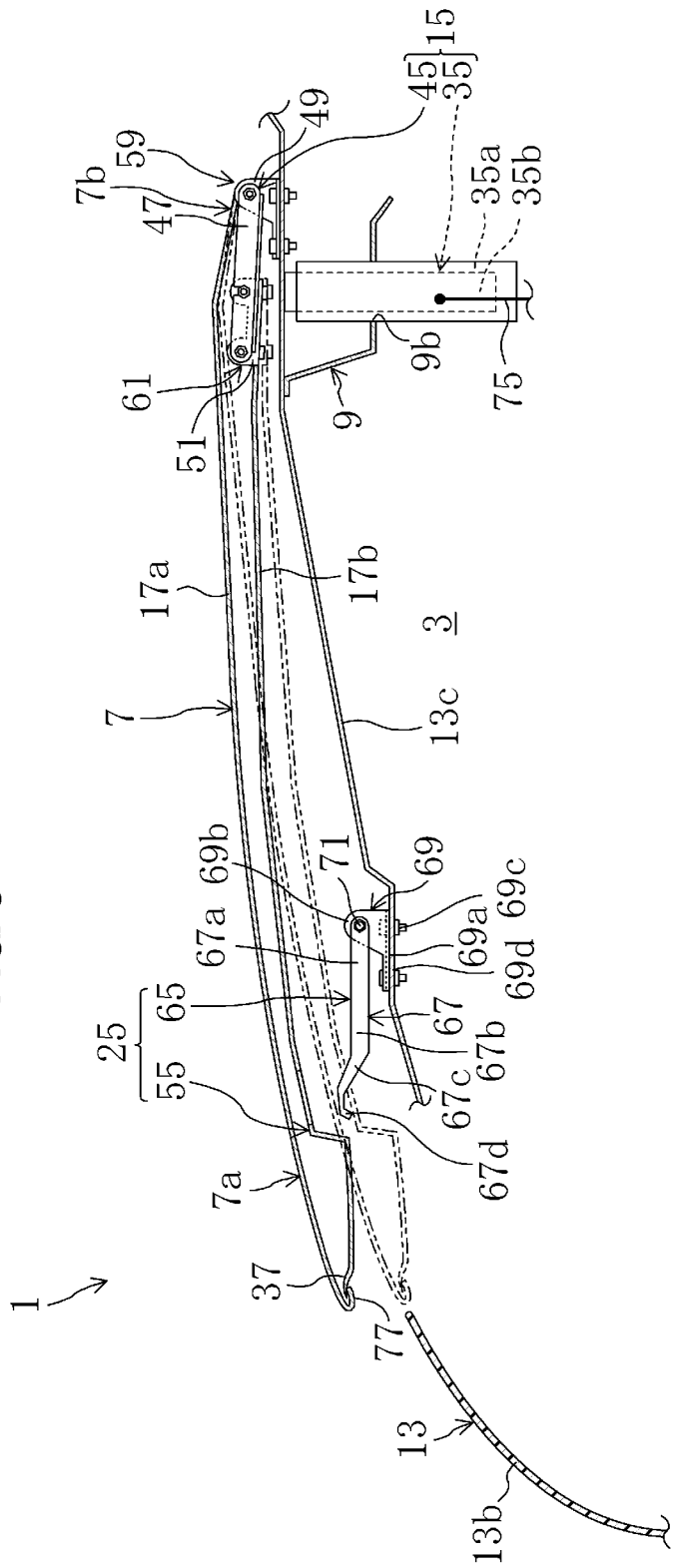
FIG. 8 is a diagram schematically explaining an opening/closing operation of an engine hood at a normal state.

Thus, by the driver or someone lifting up the front end portion 7a of the engine hood 7, as shown in FIG. 8, the engine hood 7 is rotated around the rear end portion 7b by the first hinge 59, without the engaging portion 67d of the restriction member 67 hooking at the move-amount adjusting portion 55, and opens as shown by a two-dotted broken line of FIG. 2 so that the engine room 3 can be exposed.

Meanwhile, when the collision of the pedestrian with the front bumper face 13b is predicted by the collision prediction sensor, or the collision of the pedestrian with the front bumper face is detected by the collision detection sensor, the inflator of the actuator 35 is ignited by the CPU. Thus, the inflator generates the gas and thereby the rod 35b of the actuator 35 starts rising.

As the rod 35b rises, the latch 31 is lowered by the cable 75 which is coupled to the actuator 35, so that the engagement between the latch 31 and the striker 27 is released.

When the rod 35b further rises, the upper end of the rod 35b contacts the rear-side bolt 51e which fixes the bottom wall portion 51a of the second bracket 51 to the lower end of the outside convex portion 17c of the inner panel 17b, thereby lifting up the engine hood 7. Herein, the contacting shock of the upper end of the rod 35b detaches the engaging portion 47e from the spacer with groove 63, so that the engagement between the link member 47 and the second bracket 51 (engine hood 7) is released. Further, the rising force of the engine hood 7 is transferred to a force to rotate the link member 47 around its rear end portion, that is, a force to move the engine hood 7 upwardly and rearwardly, by the first hinge 59. At the same time, the link member 47 and the second bracket 51 start to be rotated around the shaft portion of the rivet 57e so as to open by the biasing force of the torsion spring 53.

Figure 9:
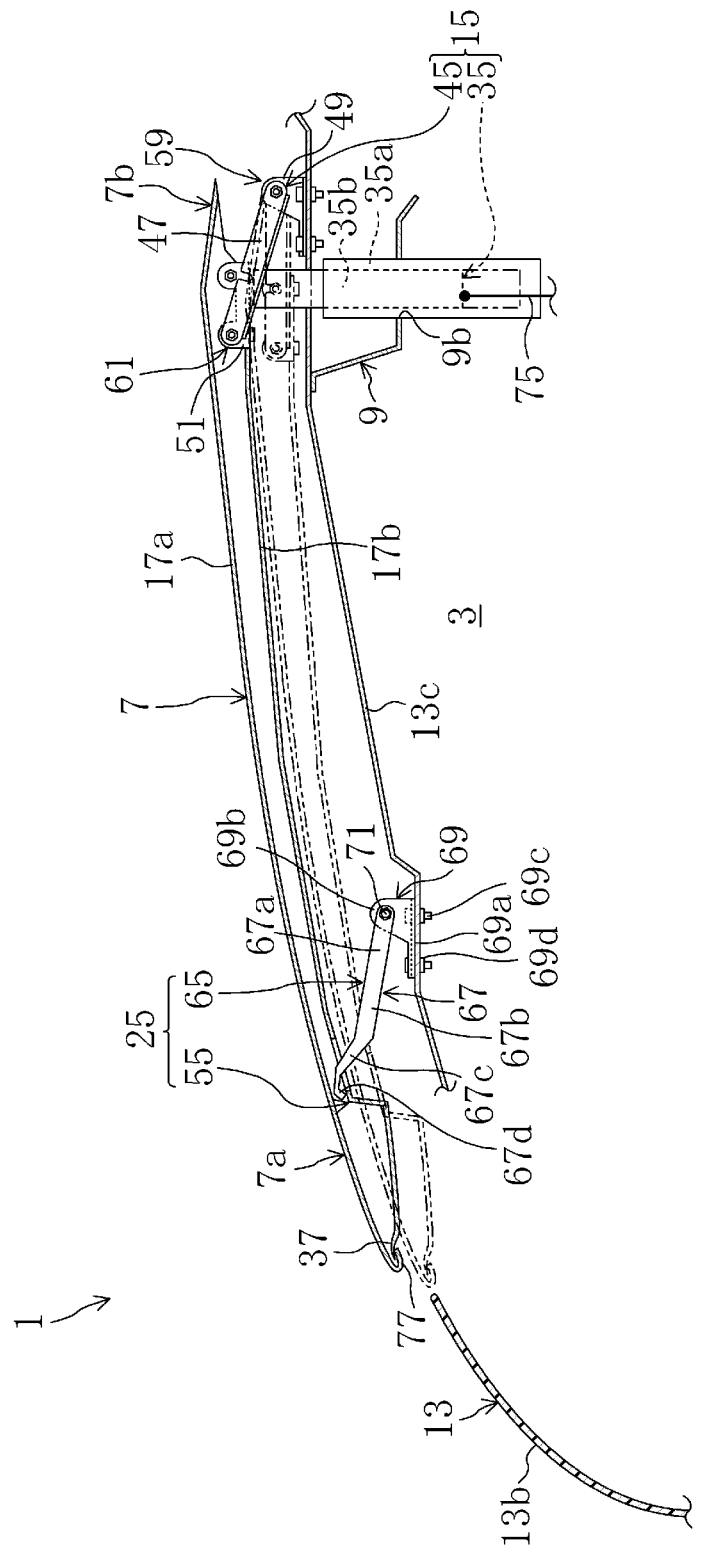
FIG. 9 is a diagram schematically explaining an upward and reward move of the engine hood when a collision of a pedestrian against a front bumper face is detected or predicted.

Meanwhile, when the engine hood 7 is moved upwardly and rearwardly, as shown in FIG. 9, the engaging portion 67d of the restriction member 67 hooks at the upper face of the inner panel 17b which forms the front-side hole wall of the move-amount adjusting portion 55. Thereby, the restriction member 67 rotates around the shaft portion of the rivet 71 so as to rise to its upward-rising state.

Figure 10:
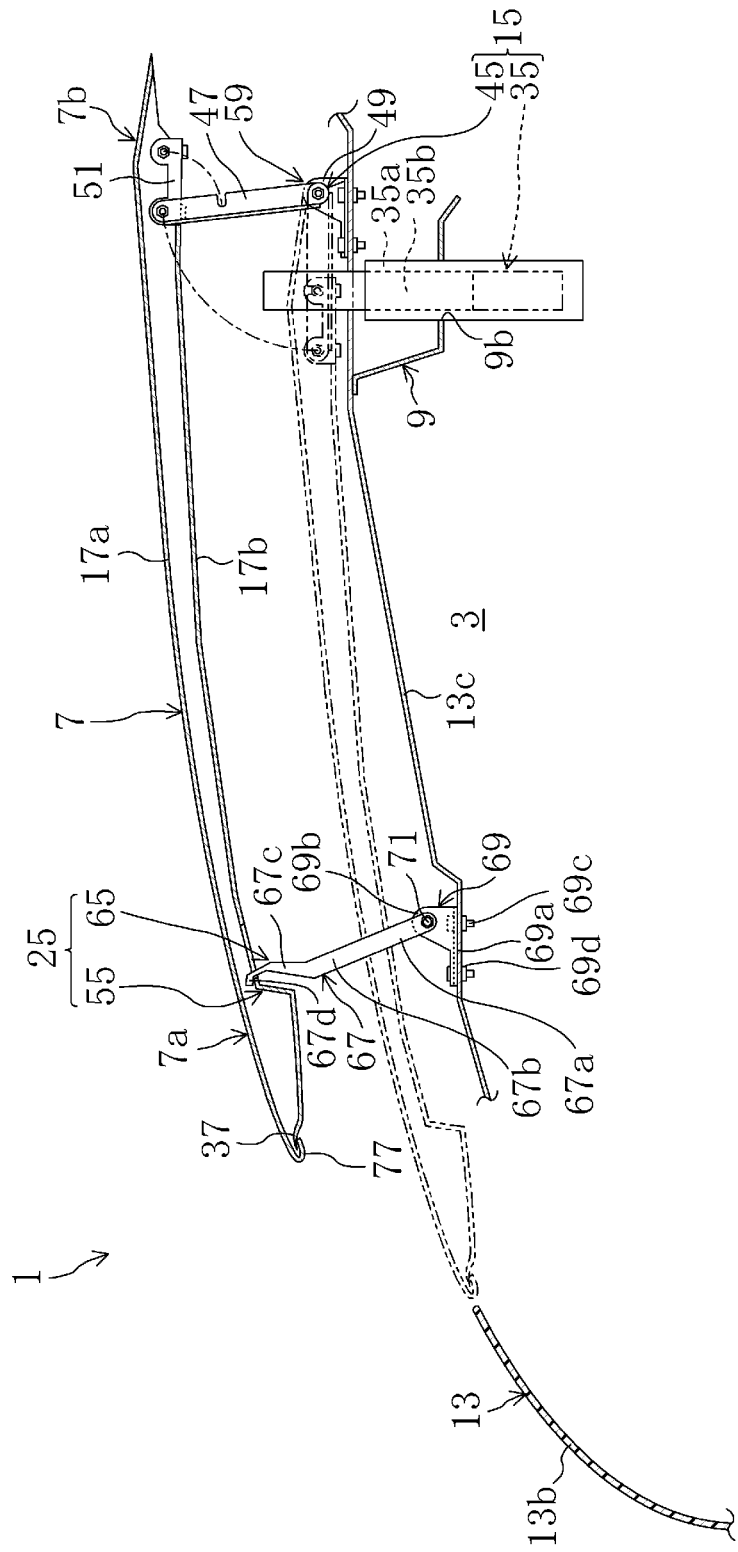
FIG. 10 is a diagram schematically explaining a state in which the upward and reward move of the engine hood is complete.

Thus, the engine hood 7 is moved upwardly and rearwardly. Herein, since the rotation of the restriction member 67 is restricted so as not to rotate beyond its upward-rising state, the moving of the engine hood 7 is complete when the restriction member 67 and the link member 47 have reached the upward-rising state shown in FIG. 10. In this state, the link member 47 takes its position of extending substantially perpendicularly to the lower face of the inner panel 17b by the biasing force of the torsion spring 53.

Thus, the engine hood 7 which has been moved upwardly and rearwardly by the guide mechanism 15 covers at least the lower end portions 21a, 21a of the front pillar 21, 21 and the wiper device 29, which have the high rigidity, respectively.

Then, when the pedestrian hits against the center, for example, of the engine hood 7 over the engine room 3 as the secondary collision, the restriction member 67 and the link member 47 rotate so as to fall forward around the shaft portions of the rivet 71 and the rivet 57a, respectively, so that the engine hood 7 is moved forwardly and downwardly. The engine hood 7 covers the cowl box 9, and when the load acting on the engine hood 7 exceeds the specified load, this lowering of the engine hood 7 absorbs the impact. As described above, the engine hood 7 is allowed to move down by the specified stroke which is ensured between the engine hood 7 and the vehicle body 13 by the restriction member 67 and the link member 47a, so that the secondary collision can be properly absorbed.

Further, when the impact of the secondary collision of the pedestrian with the engine hood 7 is so great that the load acting on the engine hood 7 exceeds the specified load, the weak portion 47f causes the buckling deformation of the link member 47. Thereby, the kinetic energy of the secondary collision is gradually transferred to the deformation energy of the link member 47. Accordingly, the impact of the secondary collision is further absorbed with the impact absorption by the specified stroke between the engine hood 7 and the vehicle body 13 and the impact absorption by the buckling deformation of the link member 47.

Moreover, even in case the pedestrian hits against not the relatively soft central portion of the engine hood 7, but a relatively hard portion of the engine hood 7 near the engine-hood guide mechanism 15, for example, the link member 47 has the buckling deformation caused by the weak portion 47f promptly. Accordingly, the kinetic energy of the secondary impact is transferred to the deformation energy of the link member 47 gradually.

Meanwhile, when the secondary collision of the pedestrian with the front end of the engine hood 7 which has been moved upwardly and rearwardly occurs, the front portion of the engine hood 7 in front of the deformation causing portion 37 deforms downwardly, and thereby the impact of the secondary collision is lightened.

According to the present embodiment, the engine-hood guide mechanism 15 provided at the vehicle-body front portion 13 guides upwardly the engine hood 7 pivotally supported at the vehicle body 13 at its rear end when the collision of the pedestrian against the front bumper face 13b is detected or predicted. Thereby, the specified stroke, i.e., the specified space, to absorb the impact from the secondary collision can be properly provided between the engine hood 7 and the vehicle body 13 prior to the secondary collision of the pedestrian and the engine hood 7, without positioning the engine hood 7 at the high level.

Further, since the engine-hood guide mechanism 15 guides the engine hood 7 not only upwardly but rearwardly, the engine hood 7 is moved rearwardly, keeping the specified stroke from the vehicle body 13, and covers the cowl box 9 storing the hard things. Moreover, since the engine-hood guide mechanism 15 lowers the engine hood 7 downwardly when the load acting on the engine hood 7 exceeds the specified load, the impact can be properly absorbed.

Thus, even in case the protection area for the secondary collision is arranged on the rear side of the engine room 3, the impact can be properly absorbed with the engine hood 7 lowering, by utilizing positively the specified stroke provided between the engine hood 7 and the vehicle body 13, so that the impact of the secondary collision can be reduced effectively.

Further, when the collision of the pedestrian against the front bumper face 13b is detected or predicted, the engine hood 7 can be promptly moved upwardly with a simple structure using the actuator 35. Further, the engine hood 7 can be moved rearwardly with the rising force applied to the engine hood 7 by using the move mechanism 45. Thus, the specified stroke provided between the engine hood 7 and the vehicle body 13 can be ensured at the collision of the pedestrian with the front bumper face 13b, and at least part of the cowl box 9 is covered with the engine hood 7. Accordingly, the impact of the secondary collision can be surely reduced by utilizing the stroke between the engine hood 7 and the vehicle body 13.

Moreover, since the engagement between the striker 27 and the latch 31 is released promptly when the collision of the pedestrian against the front bumper face 13b is detected or predicted, the engine hood 7 can be moved upwardly and rearwardly promptly.

Further, since the move-amount adjusting portion 55 allows the rotation of the engine hood 7 when the engine hood 7 rotates around the rear end portion 7b of the engine hood 7, the proper operation of the engine hood 7 can be provided at the normal state. Further, since the move-amount adjusting portion 55 restricts the rearward excessive move of the engine hood 7, the engine hood 7 can be prevented from colliding with the windshield 11, for example.

Moreover, since the restriction member 67 has the upward-rising state in accordance with the move of the engine hood 7, the engine hood 7 is supported by the restriction member 67 and the link member 47 at its front and rear. Further, the specified stroke provided between the engine hood 7 and the vehicle body 13 can be ensured along the whole length of the engine hood 7 in the vehicle longitudinal direction by the restriction member 67 having the specified length.

Further, since the rotation of the engine hood 7 around the second hinge 61 is restricted by the engaging portion 47e at the normal state, the engine hood 7 is opened or closed around the first hinge 59. When the engagement between the engaging portion 47e and the engine hood 7 is released by the actuator 35, the engine hood 7 is moved upwardly and rearwardly by using the rotations around the first and second hinges 59, 61. Further, since the opening/closing of the engine hood 7 at the normal state is conducted by the first hinge 59 which constitutes the move mechanism 45, the number of parts can be made properly small.

Accordingly, the engine hood 7 can be moved rearwardly with the rising force applied to the engine hood 7 with the simple structure, aiming at the weight reduction and facilitation of manufacturing of the vehicle 1.

Moreover, since the link member 47 of the move mechanism 45 maintains the space between the engine hood 7 and the cowl box 9 until the load acting on the engine hood 7 exceeds the specified load, and the weak portion 47f of the link member 47 causes the bucking deformation of the link member 47 when the load acting on the engine hood 7 exceeds the specified load, the kinetic energy of the secondary collision can be transferred to the deformation energy of the link member 47 and absorbed. Accordingly, the impact of the secondary collision can be surely reduced by using the specified stroke between the engine hood 7 and the vehicle body 13.

Further, even in case the pedestrian hits against the hard portion which supports the engine hood 7, that is, the portion of the engine hood 7 near the engine-hood guide mechanism 15, at the secondary collision, the move mechanism 45 has the bucking deformation at the weak portion 47f so quickly that the impact of the secondary collision can be reduced.

Moreover, since the engine-hood guide mechanism 15 guides the engine hood 7 upwardly and rearwardly so as to cover at least the lower end portions 21a, 21a of the front pillars 21, 21, the secondary collision of the pedestrian with the front pillar 21, 21 which have the relatively high rigidity can be prevented properly.

Further, even in the vehicle 1 in which the arrangement position of the engine hood 7 is relatively low and the cowl box 9 is relatively shallow, since the engine hood 7 is moved upwardly and rearwardly so as to cover the wiper device 29, the secondary collision of the pedestrian with the wiper device 29 can be prevented properly, without making the depth of the cowl box 9 greater.

Further, since the deformation causing portion 37 is provided as the impact lightening means 85 which lightens the impact of the secondary collision of the pedestrian with the front end portion 7a of the engine hood 7, the kinetic energy of the pedestrian from the secondary collision is transformed to the downward deformation energy of the tip of the engine hood 7, the impact of the secondary collision of the pedestrian with the tip of the engine hood 7 can be reduced properly.

Embodiment 2

A second embodiment comprises another impact lightening means 85' which is different from the impact lightening means 85 of the above-described first embodiment. Hereinafter, only difference from the first embodiment will be described.

Figure 13:
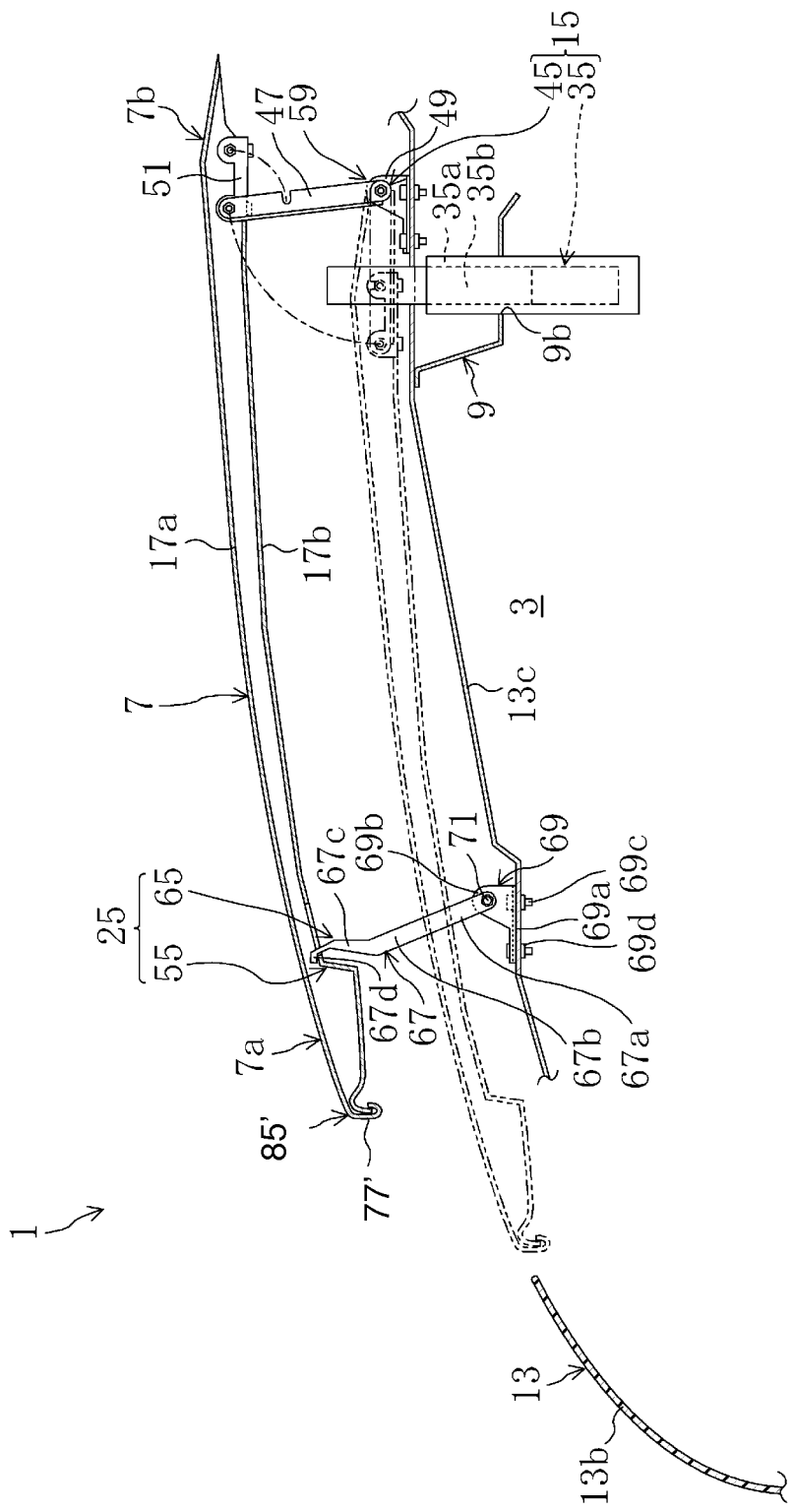
FIG. 13 is a sectional view according to a second embodiment, which corresponds to FIG. 10.

The impact lightening means 85' of the present embodiment comprises a hemming portion 77' (a tip) of the engine hood 7 which is formed so as to extend downwardly as shown in FIG. 13. Thereby, an uncovered sharp tip of the engine hood 7 which has been moved upwardly can be prevented from facing toward the pedestrian, so that the direct contact of the pedestrian with the tip of the engine hood 7 can be avoided.

Some space is formed between the front end portion of the vehicle body and the front end portion 7a of the engine hood 7 when the engine hood 7 is moved upward. Herein, since the hemming portion 77' of the engine hood 7 extends downwardly, the above-describe space is made narrower, so that the pedestrian can be also prevented from coming into the engine room 3.

Embodiment 3

A third embodiment comprises another impact lightening means 85" which is further different from the impact lightening means 85, 85' of the above-described embodiments. Hereinafter, only difference from the first and second embodiments will be described.

Figure 14:
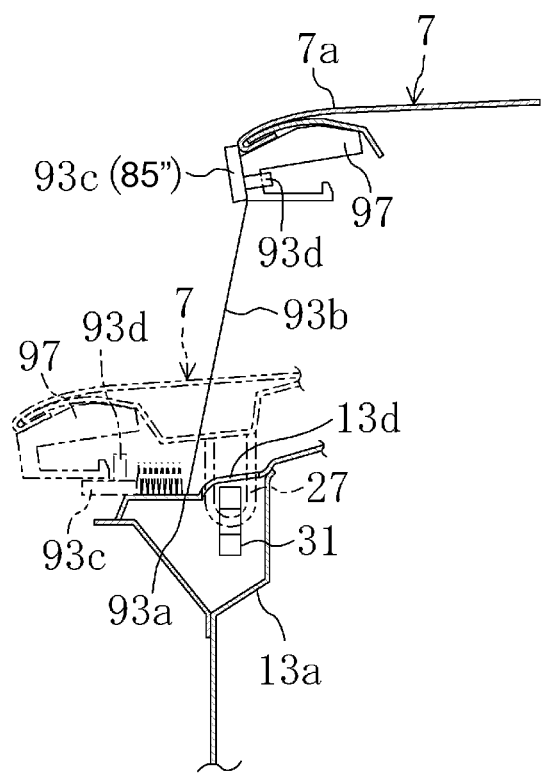
FIG. 14 is an enlarged view of the front portion of the vehicle body according to a third embodiment.
Figure 15:
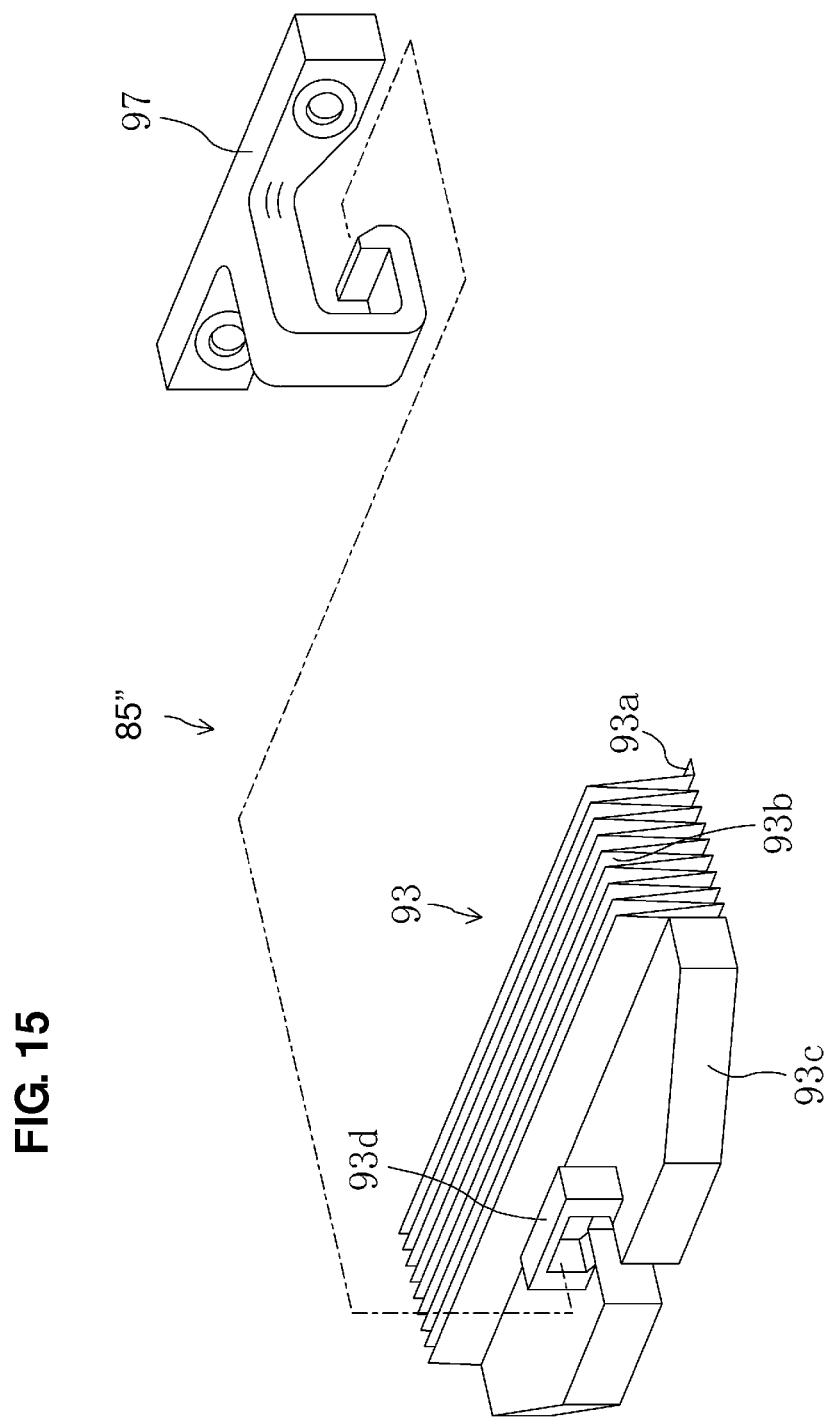
FIG. 15 is an exploded view of an impact lightening means.

The impact lightening means 85" of the present embodiment comprises, as shown in FIGS. 14 and 15, an engaging portion 97 which is provided at the front end portion of the engine hood 7 and a curtain member 93 as a cover member which is provided at the shroud member 13a. The engaging portion 97, which is made from resilient resin, is formed so as to curve rearward in a hook shape. This engaging portion 97 is attached to a lower face of the hemming portion 77 in front of the striker 27.

The curtain member 93, which is made of a nylon-fiber belt or the like, is provided almost over the whole width of the engine hood 7. This curtain member 93 comprises a base end portion 93a which is fixed to the shroud member 13a at its rear end, a folding portion 93b which connects to a front end of the base end portion 93a, and an impact absorbing portion 93c which extends forward from a front end of the folding portion 93b and has a U-shaped engagement portion 93d which projects upward at its central portion.

Herein, the curtain member 93 is arranged on the shroud member 13a in such a manner that in the normal state in which the engine hood 7 is closed, the engaging portion 97 is located in front of the engagement portion 93d, and the front end of the engaging portion 97 matches the center of a space enclosed by the U-shaped engagement portion 93d.

According to the above-described positional relationship of the engaging portion 97 and the engagement portion 93d, the engagement portion 97 does not hook at the engagement portion 93d of the curtain member 93 when the engine hood 7 is opened around the first hinge 59. Meanwhile, when the engine hood 7 is moved upwardly and rearwardly, the engagement portion 97 hooks at the engagement portion 93d.

Then, when the engagement portion 97 hooks at the engagement portion 93d, the folding portion 93b expands and rotates clockwise in FIG. 14 around the rear end of the base end portion 93a fixed to the shroud member 13a, so that the folding portion 93b extends between the engine hood 7 and the shroud member 13a. Thus, the space between the engine hood 7 and the shroud panel 13a/front bumper face 13b in front of the engine room 3 is covered with this folding portion 93b.

Further, when the engagement portion 97 hooks at the engagement portion 93d, the impact absorbing portion 93c covers over the tip of the engine hood 7 moved upwardly and rearwardly as shown in FIG. 14.

According to the present embodiment, since the space between the engine hood 7 and the shroud panel 13a in front of the engine room 3 is covered with this folding portion 93b of the impact lightening means 85, the pedestrian is prevented from coming into the engine room 3, so that the secondary collision of the pedestrian with the engine in the engine room 3 can be avoided. Further, since the impact absorbing portion 93c covers over the tip of the engine hood 7, the direct contact of the pedestrian with the uncovered tip of the engine hood 7 can be properly avoided.

Embodiment 4

A fourth embodiment comprises another impact lightening means 85''' which is further different from the impact lightening means 85, 85', 85" of the above-described embodiments. Hereinafter, only difference from the first, second and third embodiments will be described.

Figure 16:
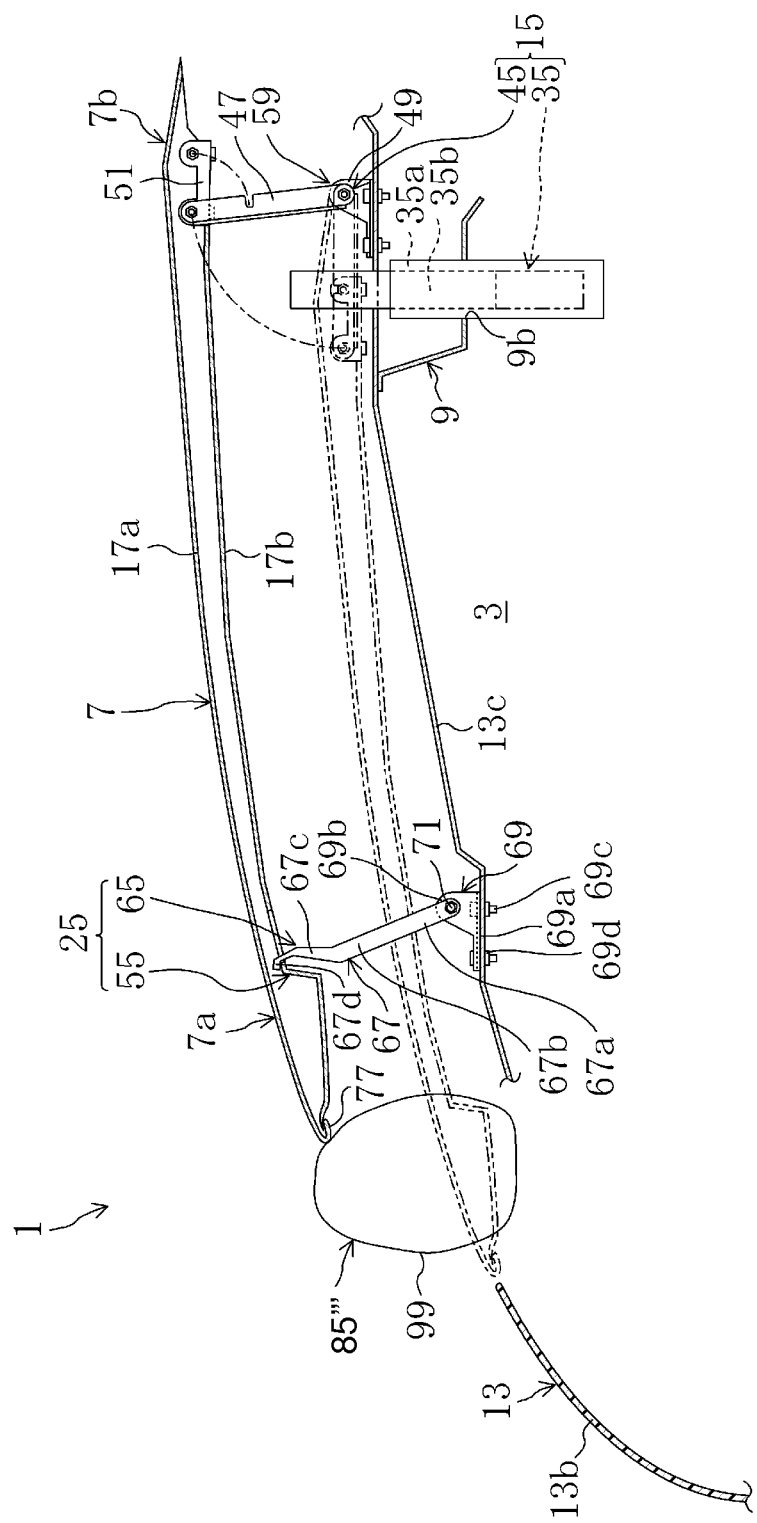
FIG. 16 is a sectional view according to a third embodiment, which corresponds to FIG. 10.

The impact lightening means 85''' of the present embodiment comprises, as shown in FIG. 16, an airbag (impact absorbing member) 99 and an inflator, not illustrated. The airbag 99 is an inflatable bag, which is made from nylon fiber or the like, which is stored in a storage portion (not illustrated) formed in the engine room 3. The inflator is comprised of an ignition portion and a gas generation source. The ignition portion receives an ignition signal from the CPU which is outputted based on the sensing information from the above-described collision predicting sensor and collision detecting sensor, and makes the gas generation source generate the inflatable gas for the airbag 99. Herein, inactive gas may be preferable as the inflatable gas.

The inflated airbag 99 extends over the space formed between the tip of the engine hood 7 and the front bumper face 13b. At the same time, the airbag 99 covers over the tip of the engine hood 7 which has been moved upwardly and rearwardly.

According to the present embodiment, since the space between the engine hood 7 and the shroud panel 13a in front of the engine room 3 is covered with this airbag 99 as the impact lightening means 85, the pedestrian can be prevented from coming into the engine room 3 and the impact which the pedestrian may receive can be reduced. Further, since the airbag 99 covers over the tip of the engine hood 7, the direct contact of the pedestrian with the uncovered tip of the engine hood 7 can be properly avoided.

The present invention should not be limited to the above-descried embodiments and their modifications, and any other improvements may be applied within the scope of a sprit of the present invention.

While the actuator 35 lifts up the engine hood 7 and the move mechanism 45 having the link member 47 moves the engine hood 7 rearwardly in the above-described embodiment, the engine hood 7 may be guided by a slide mechanism extending upwardly and rearwardly.

Further, the engine hood 7 is supported by the link members 47, 47 of the move mechanisms 45, 45 which are provided near the rear end of the engine room 3 and the restriction members 67, 67 of the move-amount adjusting portions 25, 25 which are provided near the front end of the engine room 3 at its four points in the above-described embodiment, it may be supported by the two link members 47, 47 and the single restriction member 67 at its three points or at five or more points.

Moreover, while the engagement of the latch 31 and the striker 27 is released by the cable 75 connecting the latch 31 and the rod 35b of the actuator 35 in the above-described embodiment, a device in which the engagement of the latch 31 and the striker 27 is released by a wireless signal or the like from the CPU may be provided.

Further, while the excessive rearward move of the engine hood 7 is restricted by the engaging portion 67d of the restriction member 67 which is pivotally supported at the side member 13c hooking at the move-amount adjusting portion 55 in the above-described embodiment, a bar member, which is biased upwardly and configured to project from the side member 13c so as to be inserted into the move-amount adjusting portion 55 when the collision of the pedestrian with the front bumper face 13b is predicted or detected, may be provided to restrict the excessive rearward move of the engine hood 7.

Moreover, while the hinge for the opening/closing of the engine hood 7 at the normal state is also used as the one which is used for the upward and rearward move of the engine hood 7 in the above-described embodiment, these hinges may be provided separately.

Further, the impact lightning means 85 may comprise combination of the deformation causing portion 37 of the first embodiment and the hemming portion 77' (tip) of the engine hood 7 which is formed so as to extend downwardly of the second embodiment.

What is claimed is:
1. A pedestrian protection device for a vehicle, which is provided at a front portion of a vehicle body, comprising,
an engine room,
a cowl box which is provided at an upper portion of a dash panel partitioning the engine room from a vehicle compartment and extends in a vehicle width direction, and
an engine hood which is pivotally supported at the vehicle body via a first hinge provided at a rear end portion thereof so as to cover over the engine room,
wherein the pedestrian protection device comprises,
an engine-hood guide mechanism which guides the engine hood upwardly and rearwardly so as to cover at least part of the cowl box when a collision of a pedestrian against a front end portion of the vehicle body is detected or predicted, and lowers the engine hood downwardly when a load acting on the engine hood exceeds a specified load; said engine-hood guide mechanism comprising an actuator which moves the engine hood upwardly and a move mechanism which moves the engine hood rearwardly as the engine hood rises,
at least one of a collision predicting sensor generating a signal in response to a predetermined position of a pedestrian and a collision detecting sensor generating a signal in response to a collision with a pedestrian; and
a releasing signal generator generating a releasing signal for the actuator based the signal generated by at least one of the collision predicting sensor and the collision detecting sensor;
wherein a striker is provided at a front end portion of the engine hood, a latch to engage with the striker to secure a closing state of the engine hood is provided at the vehicle body, and said actuator comprises a releasing device to release an engagement of the striker and the latch in accordance with an operation of the actuator,
wherein a move-amount adjusting portion to adjust the amount of upward-and-rearward move of the engine hood is provided at a portion of the engine hood which is located between said move mechanism and said striker in a vehicle longitudinal direction, and said move-amount adjusting portion allows a rotation of the engine hood when the engine hood rotates around the rear end portion of the engine hood, and restricts an excessive move of the engine hood when the engine hood is moved upwardly and rearwardly.

2. The pedestrian protection device for a vehicle of claim 1, wherein said engine-hood guide mechanism is positioned near a rear end of the engine room, said move-amount adjusting portion is positioned near a front end of the engine room, a restriction member is provided at the vehicle body at a position corresponding to the move-amount adjusting portion so as to rotate around a pivotal axis extending in the vehicle width direction between a forward-falling state and an upward-rising state, and said restriction member engages with the move-amount adjusting portion when the engine hood is moved upwardly and rearwardly so as to have the upward-rising state.

3. The pedestrian protection device for a vehicle of claim 1, wherein said move mechanism comprises a weak portion which causes a buckling deformation of the move mechanism when the load acting on the engine hood exceeds the specified load.

4. The pedestrian protection device for a vehicle of claim 1, wherein the cowl box supports a lower end of a windshield, both-side edges of which are supported at front pillars, and said engine-hood guide mechanism guides the engine hood upwardly and rearwardly so as to cover at least lower end portions of the front pillars.

5. The pedestrian protection device for a vehicle of claim 1, wherein a wiper device is arranged inside the cowl box, and the engine hood is moved upwardly and rearwardly so as to cover the wiper device.

6. The pedestrian protection device for a vehicle of claim 1, further comprising an impact lightening means which is provided at a front end portion of the engine hood and/or the front end portion of the vehicle body so as to lighten an impact of a secondary collision of the pedestrian with the front end portion of the engine hood.

7. The pedestrian protection device for a vehicle of claim 6, wherein said impact lightening means comprises a deformation causing portion which is formed at the front end portion of the engine hood so as to make a tip of the engine hood deform downwardly when a load is inputted to the front end portion of the engine hood.

8. The pedestrian protection device for a vehicle of claim 6, wherein said impact lightening means comprises a tip of the engine hood which is formed so as to extend downwardly.

9. The pedestrian protection device for a vehicle of claim 6, wherein said impact lightening means comprises a cover member which covers at least part of a space formed between the engine hood and the vehicle body in front of the engine room in accordance with the engine hood moving upwardly.

10. The pedestrian protection device for a vehicle of claim 9, wherein said cover member comprises an expandable curtain member.

11. The pedestrian protection device for a vehicle of claim 9, wherein said cover member comprises an inflatable airbag.

12. A pedestrian protection device for a vehicle, which is provided at a front portion of a vehicle body, comprising,
an engine room,
a cowl box which is provided at an upper portion of a dash panel partitioning the engine room from a vehicle compartment and extends in a vehicle width direction, and
an engine hood which is pivotally supported at the vehicle body via a first hinge provided at a rear end portion thereof so as to cover over the engine room,
wherein the pedestrian protection device comprises,
an engine-hood guide mechanism which guides the engine hood upwardly and rearwardly so as to cover at least part of the cowl box when a collision of a pedestrian against a front end portion of the vehicle body is detected or predicted, and lowers the engine hood downwardly when a load acting on the engine hood exceeds a specified load; said engine-hood guide mechanism comprising an actuator which moves the engine hood upwardly and a move mechanism which moves the engine hood rearwardly as the engine hood rises,
at least one of a collision predicting sensor generating a signal in response to a predetermined position of a pedestrian and a collision detecting sensor generating a signal in response to a collision with a pedestrian; and
a releasing signal generator generating a releasing signal for the actuator based the signal generated by at least one of the collision predicting sensor and the collision detecting sensor;
wherein said engine hood is coupled to the vehicle body via said move mechanism, the move mechanism comprises a first hinge, a second hinge which rotatably connects the move mechanism and the engine hood, and an engaging portion which engages with the engine hood so as to restrict a rotation of the second hinge, and the engaging portion is configured such that an engagement thereof with the engine hood is released when an upward force by said actuator acts on the engine hood.

13. The pedestrian protection device for a vehicle of claim 12, wherein a striker is provided at a front end portion of the engine hood, a latch to engage with the striker to secure a closing state of the engine hood is provided at the vehicle body, and said actuator comprises a releasing device to release an engagement of the striker and the latch in accordance with an operation of the actuator.

14. The pedestrian protection device for a vehicle of claim 12, wherein said move mechanism comprises a link member which has said engaging portion, connects said first hinge and second hinge, and maintains a space which is formed between the engine hood and the cowl box until the load acting on the engine hood exceeds the specified load when the engagement with the engine hood is released, and said link member has a weak portion which causes a bucking deformation of the move mechanism.

15. The pedestrian protection device for a vehicle of claim 12, wherein said move mechanism comprises a weak portion which causes a buckling deformation of the move mechanism when the load acting on the engine hood exceeds the specified load.

16. The pedestrian protection device for a vehicle of claim 12, wherein the cowl box supports a lower end of a windshield, both-side edges of which are supported at front pillars, and said engine-hood guide mechanism guides the engine hood upwardly and rearwardly so as to cover at least lower end portions of the front pillars.

17. The pedestrian protection device for a vehicle of claim 12, further comprising an impact lightening means which is provided at a front end portion of the engine hood and/or the front end portion of the vehicle body so as to lighten an impact of a secondary collision of the pedestrian with the front end portion of the engine hood.

18. The pedestrian protection device for a vehicle of claim 17, wherein said impact lightening means comprises a deformation causing portion which is formed at the front end portion of the engine hood so as to make a tip of the engine hood deform downwardly when a load is inputted to the front end portion of the engine hood.

19. The pedestrian protection device for a vehicle of claim 17, wherein said impact lightening means comprises a cover member which covers at least part of a space formed between the engine hood and the vehicle body in front of the engine room in accordance with the engine hood moving upwardly.

20. The pedestrian protection device for a vehicle of claim 17, wherein said impact lightening means comprises a cover member which covers at least part of a space formed between the engine hood and the vehicle body in front of the engine room in accordance with the engine hood moving upwardly.

* * * * *